US012127225B2

(12) United States Patent
Zhao

(10) Patent No.: US 12,127,225 B2
(45) Date of Patent: Oct. 22, 2024

(54) RESOURCE ALLOCATION MODE CONFIGURATION METHOD, TERMINAL AND NETWORK DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 578 days.

(21) Appl. No.: 17/414,203

(22) PCT Filed: Sep. 29, 2019

(86) PCT No.: PCT/CN2019/108878
§ 371 (c)(1),
(2) Date: Jun. 15, 2021

(87) PCT Pub. No.: WO2020/125124
PCT Pub. Date: Jun. 25, 2020

(65) Prior Publication Data
US 2022/0141827 A1 May 5, 2022

(30) Foreign Application Priority Data
Dec. 17, 2018 (CN) .......................... 201811541756.1

(51) Int. Cl.
*H04W 72/51* (2023.01)
*H04W 72/044* (2023.01)
(Continued)

(52) U.S. Cl.
CPC ......... *H04W 72/51* (2023.01); *H04W 72/044* (2013.01); *H04W 72/542* (2023.01); *H04W 92/18* (2013.01)

(58) Field of Classification Search
CPC ..................................................... H04W 72/51
See application file for complete search history.

(56) References Cited

U.S. PATENT DOCUMENTS

2016/0050698 A1  2/2016 Siomina
2017/0006653 A1* 1/2017 Zeng ..................... H04W 72/23
(Continued)

FOREIGN PATENT DOCUMENTS

CN  106211204 A  12/2016
CN  106465388 A   2/2017
(Continued)

OTHER PUBLICATIONS

European Search Report for application No. 19898277.9 issued on Jan. 21, 2022.
(Continued)

*Primary Examiner* — Jason E Mattis
(74) *Attorney, Agent, or Firm* — Ladas & Parry, LLP

(57) ABSTRACT

The present disclosure provides a resource allocation mode configuration method, a terminal and a network device, and relates to the field of communication technology. The resource allocation mode configuration method is applied to a terminal and includes: receiving a resource allocation mode for a sidelink interface configured by a network device; the resource allocation mode is configured by the network device for each target, the target includes at least one of the following information: a radio bearer of the sidelink interface SLRB; QoS parameters of the sidelink interface; a frequency band identifier; a RAT used by the sidelink interface, the frequency band identifier includes: a carrier, a frequency, or a BWP.

17 Claims, 4 Drawing Sheets

(51) Int. Cl.
*H04W 72/542* (2023.01)
*H04W 92/18* (2009.01)

(56) References Cited

U.S. PATENT DOCUMENTS

| | | | |
|---|---|---|---|
| 2017/0034831 A1 | 2/2017 | Yerramalli et al. | |
| 2017/0048908 A1 | 2/2017 | Matsumoto | |
| 2017/0230958 A1* | 8/2017 | Lee | H04W 72/54 |
| 2017/0339715 A1 | 11/2017 | Burbidge et al. | |
| 2019/0124015 A1* | 4/2019 | Loehr | H04L 5/0058 |
| 2019/0239112 A1* | 8/2019 | Rao | H04W 76/14 |
| 2020/0107171 A1* | 4/2020 | Chen | H04W 76/27 |
| 2020/0163005 A1* | 5/2020 | Rao | H04W 4/44 |
| 2021/0297939 A1* | 9/2021 | Lu | H04W 4/70 |

FOREIGN PATENT DOCUMENTS

| | | | |
|---|---|---|---|
| CN | 107852611 A | 3/2018 | |
| EP | 2166804 A1 | 3/2010 | |
| EP | 3101978 A1 | 12/2016 | |
| EP | 3273634 A1 | 1/2018 | |
| EP | 3334229 A1 | 6/2018 | |
| WO | 2015147605 A1 | 10/2015 | |
| WO | 2016021699 A1 | 2/2016 | |

OTHER PUBLICATIONS

First Office Action for Japanese Patent Application 2021-534998 issued on Jun. 14, 2022, and its English translation provided by Global Dossier.

"Sidelink PHY structure and procedure for NR V2X," 3GPP TSG RAN WG1 Meeting #94bis, R1-1810138, Chengdu, China, Oct. 8-12, 2018, Agenda Item: 7.2.4.1.2, Source: Huawei, HiSilicon, all pages.

"Potential RAN2 impacts on gNB scheduled resource allocation for NR V2x," 3GPP TSG-RAN WG2 # 104, R2-1816518, Spokane, USA, Nov. 12-16, 2018, Agenda Item:11.4.2.4, Source: Huawei, HiSilicon, all pages.

"Radio bearer configuration and management for NR sidelink," 3GPP TSG-RAN WG2 Meeting #104, R2-1816522, Spokane, USA, Nov. 12-16, 2018, Agenda Item: 11.4.5, Source: Huawei, HiSilicon, all pages.

First Office Action and search report from CN app. No. 201811541756. 1, dated Dec. 17, 2020, with English translation from Global Dossier, all pages.

Second Office Action and search report from CN app. No. 201811541756.1, dated May 25, 2021, with English translation from Global Dossier, all pages.

International Search Report from PCT/CN2019/108878, dated Dec. 30, 2019, with English translation from WIPO, all pages.

Written Opinion of the International Searching Authority from PCT/CN2019/108878, dated Jun. 16, 2021, with English translation from WIPO, all pages.

International Preliminary Report on Patentability from PCT/CN2019/108878, dated Dec. 30, 2019, with English translation from WIPO, all pages.

Intel Corporation, "Coexistence Mechanisms for eV2X Services", R1-1810781, 3GPP TSG RAN WG1 Meeting #94bis, Chengdu, China, Oct. 8-12, 2018, all pages.

Vivo, "Communication range for NR V2X", R2-1813926, 3GPP TSG-RAN WG2 Meeting#103bis, Chengdu, China, Oct. 8-12, 2018, all pages.

Huawei (rapporteur), "Summary of [103bis#37][NR/V2X]—NR sidelink design, CP aspects", R2-1816515, 3GPP TSG-RAN WG2 Meeting #104, Spokane, USA, Nov. 12-16, 2018, all pages.

CATT, "Resource Allocation Mode Control", R2-1900146, 3GPP TSG-RAN WG2 Meeting #105, Athens, Greece, Feb. 25-Mar. 1, 2019, all pages.

CATT, "Support for Simultaneous Configuration of Mode 1 and Mode 2", R2-1905810, 3GPP TSG-RAN WG2 Meeting #106, Reno, USA, May 13-17, 2019, all pages.

Second Office Action for Japanese Patent Application 2021-534998 issued on Oct. 25, 2022, by the Japanese Patent Office and its English Translation provided by global dossier.

* cited by examiner receiving a resource allocation mode for a sidelink interface configured by a network device ⸺ 21

RESOURCE ALLOCATION MODE CONFIGURATION METHOD, TERMINAL AND NETWORK DEVICE

CROSS-REFERENCE TO RELATED APPLICATIONS

This application is the U.S. national phase of PCT Application No. PCT/CN2019/108878 filed on Sep. 29, 2019, which claims a priority of the Chinese patent application No. 201811541756.1 filed on Dec. 17, 2018, the disclosures of which are incorporated herein by reference in their entireties.

TECHNICAL FIELD

The present disclosure relates to the field of communication technology, in particular to a resource allocation mode configuration method, a terminal and a network device.

BACKGROUND

In the traditional Long Term Evolution (LTE) system, for a terminal in a connected state, the resource allocation mode used on the sidelink interface of the terminal is determined by the network, and the network will configure the terminal to use the only one resource allocation mode on the sidelink interface.

For the New Radio (NR) system, sidelink interface services will be more abundant than the LTE system. Therefore, using only one resource allocation mode on the sidelink interface will not be able to meet the quality of service (QoS) requirements of the sidelink communication service.

SUMMARY

The present disclosure provides a resource allocation mode configuration method, a terminal and a network device, so as to solve the problem in the LET system in the related art that only one resource allocation mode on the sidelink interface will not be able to meet the quality of service (QoS) requirements of the sidelink communication service in the NR system.

In order to solve the above program, some embodiments of the present disclosure provides resource allocation mode configuration method, applied to a terminal, including: receiving a resource allocation mode of a sidelink interface configured by a network device; wherein the resource allocation mode is configured by the network device for each target, the target includes at least one of the following information: a radio bearer of the sidelink interface (Sidelink Radio Bearer, SLRB); quality of service (QoS) parameters of the sidelink interface; a frequency band identifier; a radio access technology (RAT) used by the sidelink interface, wherein the frequency band identifier includes: a carrier, a frequency, or a bandwidth part (BWP).

Optionally, before the receiving a resource allocation mode of a sidelink interface configured by a network device, the method further includes: reporting terminal capability information to the network device.

Optionally, the terminal capability information is used to indicate whether the terminal supports simultaneous use of a plurality of sidelink interface resource allocation modes.

Optionally, before the receiving a resource allocation mode of a sidelink interface configured by a network device, the method further includes: reporting auxiliary information to the network device.

Optionally, the auxiliary information is reported based on one of the following information: QoS parameters of the sidelink interface; SLRB; a frequency band identifier or RAT used by the sidelink interface.

Optionally, when the auxiliary information is reported based on the QoS parameters of the sidelink interface, the terminal reports at least one of the following information: values of all or part of QoS parameters used by a current service on the sidelink interface of the terminal; identifiers of the QoS parameters used by the current service on the sidelink interface of the terminal.

Optionally, when the auxiliary information is reported based on the SLRB, the terminal separately reports at least one of the following information for each SLRB: identification information of the SLRB; identification information of RAT corresponding to the SLRB; a transmission frequency expected by the SLRB; a communication target corresponding to the SLRB; QoS parameters corresponding to the SLRB; service characteristics of the SLRB.

Optionally, the service characteristics include: service cycle information and/or a data packet size.

Optionally, when the auxiliary information is reported based on the frequency band identifier or the RAT used by the sidelink interface, the auxiliary information includes at least one of the following information: a identifier of the SLRB expected to be transmitted in the frequency band identifier and the RAT used by the sidelink interface; a number of SLRBs expected to be transmitted in the frequency band identifier and the RAT used by the sidelink interface; the QoS parameters of the SLRB expected to be transmitted in the frequency band identifier and the RAT used by the sidelink interface.

Some embodiment of the present disclosure further provides a resource allocation mode configuration method, applied to a network device, including: configuring a resource allocation mode of a sidelink interface for a terminal for each target, wherein the target includes at least one of the following information: a radio bearer of the sidelink interface (Sidelink Radio Bearer, SLRB); quality of service (QoS) parameters of the sidelink interface; a frequency band identifier; a radio access technology (RAT) used by the sidelink interface; wherein the frequency band identifier includes: a carrier, a frequency, or a bandwidth part (BWP).

Optionally, before the configuring the resource allocation mode of the sidelink interface for the terminal for each target, the method further includes: receiving terminal capability information reported by the terminal.

Optionally, the terminal capability information is used to indicate whether the terminal supports simultaneous use of multiple sidelink interface resource allocation modes.

Optionally, before the configuring the resource allocation mode of the sidelink interface for the terminal for each target, the method further includes: receiving auxiliary information reported by the terminal.

Optionally, the auxiliary information is reported by the terminal based on one of the following information: QoS parameters of the sidelink interface; SLRB; a frequency band identifier or RAT used by the sidelink interface.

Optionally, when the auxiliary information is reported by the terminal based on the QoS parameters of the sidelink interface, the terminal reports at least one of the following information: values of all or part of QoS parameters used by a current service on the sidelink interface of the terminal; identifiers of the QoS parameters used by the current service on the sidelink interface of the terminal.

Optionally, when the auxiliary information is reported based on the SLRB, the terminal separately reports at least one of the following information for each SLRB: identification information of the SLRB; identification information of RAT corresponding to the SLRB; a transmission frequency expected by the SLRB; a communication target corresponding to the SLRB; QoS parameters corresponding to the SLRB; service characteristics of the SLRB.

Optionally, the service characteristics include: service cycle information and/or a data packet size.

Optionally, when the auxiliary information is reported based on the frequency band identifier or the RAT used by the sidelink interface, the auxiliary information includes at least one of the following information: a identifier of the SLRB expected to be transmitted in the frequency band identifier and the RAT used by the sidelink interface; a number of SLRBs expected to be transmitted in in the frequency band identifier and the RAT used by the sidelink interface; the QoS parameters of the SLRB expected to be transmitted in the frequency band identifier and the RAT used by the sidelink interface.

Optionally, when the target includes SLRB, the configuration mode of the resource allocation mode includes one of the following modes: the resource allocation mode is configured based on each SLRB; the resource allocation mode is configured based on each SLRB, and is independently configured based on each frequency band identifier; the resource allocation mode is configured based on each SLRB, and is independently configured based on each RAT; the resource allocation mode is configured based on each SLRB, and is independently configured based on each frequency band identifier of each RAT.

Optionally, when the resource allocation mode is configured based on each SLRB, the configuring the resource allocation mode of the sidelink interface for the terminal includes one of the following modes: based on each SLRB, a resource allocation mode corresponding to the SLRB is configured in radio resource control (RRC) signaling; based on each resource allocation mode, information of the SLRB allowed to use the resource allocation mode is given in the RRC signaling.

Optionally, when the resource allocation mode is configured based on each SLRB and is independently configured based on each frequency band identifier, the configuring the resource allocation mode of the sidelink interface for the terminal includes one of the following modes: the RRC signaling carries identification information of the frequency band identifier, and based on each frequency band identifier, the resource allocation mode corresponding to each SLRB transmitted on the frequency band identifier is configured; the RRC signaling carries identification information of the frequency band identifier, and based on each frequency band identifier, the information of the SLRB allowed to use the resource allocation mode is configured for each resource allocation mode respectively.

Optionally, when the resource allocation mode is configured based on each SLRB and is independently configured based on each RAT, the configuring the resource allocation mode of the sidelink interface for the terminal includes one of the following modes: the RRC signaling carries identification information of the RAT, and based on each RAT, the resource allocation mode corresponding to each SLRB transmitted on the RAT is respectively configured; the RRC signaling carries the identification information of the RAT, and based on each RAT, for each resource allocation mode, the information of the SLRB allowed to use the resource allocation mode is respectively configured.

Optionally, when the resource allocation mode is configured based on each SLRB and is configured independently based on each frequency band identifier of each RAT, the configuring the resource allocation mode of the sidelink interface for the terminal includes one of the following modes: the RRC signaling carries the identification information of the RAT and the identification information of the frequency band identifier, and based on each frequency band identifier of each RAT, the resource allocation mode corresponding to each SLRB transmitted on the RAT is respectively configured; the RRC signaling carries the identification information of the RAT and the identification information of the frequency band identifier, based on each frequency band identification of each RAT, for each resource allocation mode, the information of the SLRB allowed to use the resource allocation mode is respectively configured.

Optionally, when the target includes the QoS parameters of the sidelink interface, the configuration mode of the resource allocation mode includes one of the following modes: the resource allocation mode is configured based on different value combinations of all QoS parameters; the resource allocation mode is configured based on different value combinations of all QoS parameters, and is independently configured based on each frequency band identifier; the resource allocation mode is configured based on different value combinations of all QoS parameters, and is configured independently based on each RAT; the resource allocation mode is configured based on different value combinations of all QoS parameters, and is independently configured based on each frequency band identifier of each RAT; the resource allocation mode is configured based on different value combinations of part of QoS parameters; the resource allocation mode is configured based on different value combinations of part of QoS parameters, and is independently configured based on each frequency band identifier; the resource allocation mode is configured based on different value combinations of part of QoS parameters, and is independently configured based on each RAT; the resource allocation mode is configured based on different value combinations of part of QoS parameters, and is independently configured based on each frequency band identifier of each RAT.

Optionally, when the target includes a frequency band identifier, the configuring the resource allocation mode of the sidelink interface for the terminal includes: a first RRC signaling carrying frequency band identification information, and configuring a resource allocation mode corresponding to the frequency band identification based on each frequency band identifier.

Optionally, the configuring the resource allocation mode of the sidelink interface for the terminal further includes: the first RRC signaling carrying frequency band identification information, and based on each frequency band identifier, for each resource allocation mode, configuring information of SLRB allowed to use the resource allocation mode respectively.

Optionally, when the target includes a RAT, the configuring the resource allocation mode of the sidelink interface for the terminal includes: a second RRC signaling carrying RAT information, and configuring the resource allocation mode corresponding to the RAT based on each RAT.

Optionally, the configuring the resource allocation mode of the sidelink interface for the terminal further includes: the second RRC signaling carrying the RAT information, and based on each RAT, for each resource allocation mode, configuring information of SLRB allowed to use the resource allocation mode respectively.

Some embodiment of the present disclosure provides a terminal, including: a transceiver, a memory, a processor, and a program stored on the memory and executed by the processor; wherein the processor executes the program to implement the following steps: receiving a resource allocation mode of a sidelink interface configured by a network device; wherein the resource allocation mode is configured by the network device for each target, the target includes at least one of the following information: a radio bearer of the sidelink interface (Sidelink Radio Bearer, SLRB); quality of service (QoS) parameters of the sidelink interface; a frequency band identifier; a radio access technology (RAT) used by the sidelink interface, wherein the frequency band identifier includes: a carrier, a frequency, or a bandwidth part (BWP).

Optionally, the processor executes the program to implement the following step: reporting terminal capability information to the network device through the transceiver; wherein the terminal capability information is used to indicate whether the terminal supports simultaneous use of a plurality of sidelink interface resource allocation modes.

Optionally, the processor executes the program to implement the following step: reporting auxiliary information to the network device; wherein the auxiliary information is reported based on one of the following information: QoS parameters of the sidelink interface; SLRB; a frequency band identifier or RAT used by the sidelink interface.

Optionally, when the auxiliary information is reported based on the QoS parameters of the sidelink interface, the terminal reports at least one of the following information: values of all or part of the QoS parameters used by a current service on the sidelink interface of the terminal; identifiers of the QoS parameter used by the current service on the sidelink interface of the terminal; or when the auxiliary information is reported based on the SLRB, the terminal separately reports at least one of the following information for each SLRB: identification information of the SLRB; identification information of RAT corresponding to the SLRB; a transmission frequency expected by the SLRB; a communication target corresponding to the SLRB; QoS parameters corresponding to the SLRB; service characteristics of the SLRB, wherein the service characteristics include: service cycle information and/or a data packet size; or when the auxiliary information is reported based on the frequency band identifier or the RAT used by the sidelink interface, the auxiliary information includes at least one of the following information: a identifier of the SLRB expected to be transmitted in the frequency band identifier and the RAT used by the sidelink interface; a number of SLRBs expected to be transmitted in the frequency band identifier and the RAT used by the sidelink interface; the QoS parameters of the SLRB expected to be transmitted in the frequency band identifier and the RAT used by the sidelink interface.

Some embodiments of the present disclosure provides a network device, including: a transceiver, a memory, a processor, and a program stored on the memory and executed by the processor; wherein the processor executes the program to implement the following step: configuring a resource allocation mode of a sidelink interface for a terminal for each target, wherein the target includes at least one of the following information: a radio bearer of the sidelink interface (Sidelink Radio Bearer, SLRB); quality of service (QoS) parameters of the sidelink interface; a frequency band identifier; a radio access technology (RAT) used by the sidelink interface; wherein the frequency band identifier includes: a carrier, a frequency, or a bandwidth part (BWP).

Optionally, the processor executes the program to implement the following step: receiving terminal capability information reported by the terminal through the transceiver; wherein the terminal capability information is used to indicate whether the terminal supports simultaneous use of multiple sidelink interface resource allocation modes.

Optionally, the processor executes the program to implement the following step: receiving auxiliary information reported by the terminal through the transceiver; wherein the auxiliary information is reported by the terminal based on one of the following information: QoS parameters of the sidelink interface; SLRB; a frequency band identifier or RAT used by the sidelink interface.

Optionally, when the auxiliary information is reported by the terminal based on the QoS parameters of the sidelink interface, the terminal reports at least one of the following information: values of all or part of QoS parameters used by a current service on the sidelink interface of the terminal; identifiers of the QoS parameters used by the current service on the sidelink interface of the terminal; or when the auxiliary information is reported based on the SLRB, the terminal separately reports at least one of the following information for each SLRB: identification information of the SLRB; identification information of RAT corresponding to the SLRB; a transmission frequency expected by the SLRB; a communication target corresponding to the SLRB; QoS parameters corresponding to the SLRB; service characteristics of the SLRB, the service characteristics include: service cycle information and/or data packet size; or when the auxiliary information is reported based on the frequency band identifier or the RAT used by the sidelink interface, the auxiliary information includes at least one of the following information: a identifier of the SLRB expected to be transmitted in the frequency band identifier and the RAT used by the sidelink interface; a number of SLRBs expected to be transmitted in in the frequency band identifier and the RAT used by the sidelink interface; the QoS parameters of the SLRB expected to be transmitted in the frequency band identifier and the RAT used by the sidelink interface.

Optionally, when the target includes SLRB, the configuration mode of the resource allocation mode includes one of the following modes: the resource allocation mode is configured based on each SLRB; the resource allocation mode is configured based on each SLRB, and is independently configured based on each frequency band identifier; the resource allocation mode is configured based on each SLRB, and is independently configured based on each RAT; the resource allocation mode is configured based on each SLRB, and is independently configured based on each frequency band identifier of each RAT.

Optionally, when the resource allocation mode is configured based on each SLRB, the processor executes the program to implement one of the following steps: based on each SLRB, a resource allocation mode corresponding to the SLRB is configured in radio resource control (RRC) signaling; based on each resource allocation mode, information of the SLRB allowed to use the resource allocation mode is given in the RRC signaling; or when the resource allocation mode is configured based on each SLRB and is independently configured based on each frequency band identifier, the processor executes the program to implement one of the following steps: the RRC signaling carries identification information of the frequency band identifier, and based on each frequency band identifier, the resource allocation mode corresponding to each SLRB transmitted on the frequency band identifier is configured; the RRC signaling carries identification information of the frequency band identifier, and based on each frequency band identifier, the information of the SLRB allowed to use the resource allocation mode is configured for each resource allocation mode respectively; or when the resource allocation mode is configured based on each SLRB and is independently configured based on each RAT, the processor executes the program to implement one of the following steps: the RRC signaling carries identification information of the RAT, and based on each RAT, the resource allocation mode corresponding to each SLRB transmitted on the RAT is respectively configured; the RRC signaling carries the identification information of the RAT, and based on each RAT, for each resource allocation mode, the information of the SLRB allowed to use the resource allocation mode is respectively configured; or when the resource allocation mode is configured based on each SLRB and is configured independently based on each frequency band identifier of each RAT, the processor executes the program to implement one of the following steps: the RRC signaling carries the identification information of the RAT and the identification information of the frequency band identifier, and based on each frequency band identifier of each RAT, the resource allocation mode corresponding to each SLRB transmitted on the RAT is respectively configured; the RRC signaling carries the identification information of the RAT and the identification information of the frequency band identifier, based on each frequency band identification of each RAT, for each resource allocation mode, the information of the SLRB allowed to use the resource allocation mode is respectively configured.

Optionally, when the target includes the QoS parameters of the sidelink interface, the configuration mode of the resource allocation mode includes one of the following modes: the resource allocation mode is configured based on different value combinations of all QoS parameters; the resource allocation mode is configured based on different value combinations of all QoS parameters, and is independently configured based on each frequency band identifier; the resource allocation mode is configured based on different value combinations of all QoS parameters, and is configured independently based on each RAT; the resource allocation mode is configured based on different value combinations of all QoS parameters, and is independently configured based on each frequency band identifier of each RAT; the resource allocation mode is configured based on different value combinations of part of QoS parameters; the resource allocation mode is configured based on different value combinations of part of QoS parameters, and is independently configured based on each frequency band identifier; the resource allocation mode is configured based on different value combinations of part of QoS parameters, and is independently configured based on each RAT; the resource allocation mode is configured based on different value combinations of part of QoS parameters, and is independently configured based on each frequency band identifier of each RAT.

Optionally, when the target includes a frequency band identifier, the processor executes the program to implement the following step: a first RRC signaling carrying frequency band identification information, and configuring a resource allocation mode corresponding to the frequency band identification based on each frequency band identifier.

Optionally, the processor further executes the program to implement the following step: the first RRC signaling carrying frequency band identification information, and based on each frequency band identifier, for each resource allocation mode, configuring information of SLRB allowed to use the resource allocation mode respectively.

Optionally, when the target includes a RAT, the processor executes the program to implement the following step: a second RRC signaling carrying RAT information, and configuring the resource allocation mode corresponding to the RAT based on each RAT.

Optionally, the processor further executes the program to implement the following step: the second RRC signaling carrying the RAT information, and based on each RAT, for each resource allocation mode, configuring information of SLRB allowed to use the resource allocation mode respectively.

Some embodiment of the present disclosure further provides a computer-readable storage medium having a computer program stored thereon, and wherein the processor executes the computer program to implement the resource allocation mode configuration method.

Some embodiment of the present disclosure further provides a terminal, including: a receiving module, configured to receive a resource allocation mode for a sidelink interface configured by a network device; wherein the resource allocation mode is configured by the network device for each target, the target includes at least one of the following information: a radio bearer of the sidelink interface (Sidelink Radio Bearer, SLRB); quality of service (QoS) parameters of the sidelink interface; a frequency band identifier; a radio access technology (RAT) used by the sidelink interface, wherein the frequency band identifier includes: a carrier, a frequency, or a bandwidth part (BWP).

Some embodiment of the present disclosure further provides a network device, comprising: a configuration module, configured to configure a resource allocation mode of a sidelink interface for a terminal for each target; wherein the target includes at least one of the following information: a radio bearer of the sidelink interface (Sidelink Radio Bearer, SLRB); quality of service (QoS) parameters of the sidelink interface; a frequency band identifier; a radio Access Technology (RAT) used by the sidelink interface, wherein the frequency band identifier includes: a carrier, a frequency, or a bandwidth part (BWP).

The beneficial effects of the above technical solutions of the present disclosure are as follows.

In the above solutions, the resource allocation mode of the sidelink interface is configured based on SLRB, QoS parameters of the sidelink interface, a frequency band identifier or RAT, the flexibility of configuring the resource allocation mode of the sidelink communication service in the NR system, the QoS requirement of the sidelink communication service can be guaranteed.

DETAILED DESCRIPTION

In order to make the objectives, technical solutions, and advantages of the present disclosure clearer, the present disclosure will be described in detail below with reference to the accompanying drawings and specific embodiments.

First, some concepts mentioned in some embodiments of the present disclosure are described as follows.

1. Background Introduction to Sidelink Communication of LTE System

Figures 1, 2:
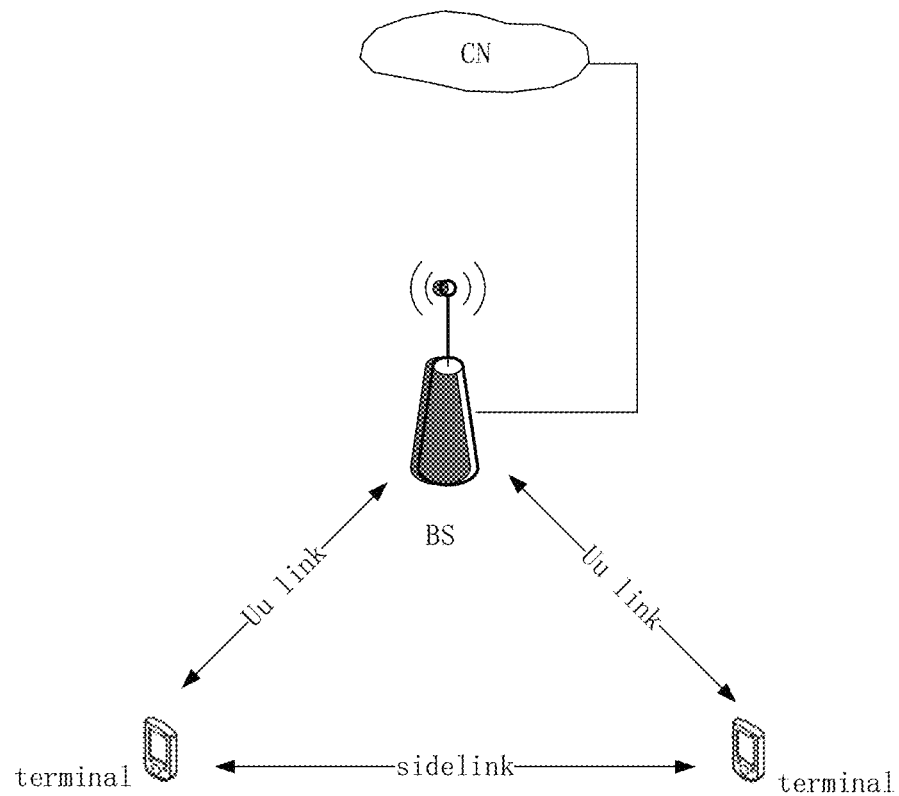
FIG. 1 shows a schematic diagram of a communication link between a terminal and a base station, and between a terminal and a terminal.
FIG. 2 shows a schematic flowchart of a resource allocation mode configuration method applied to a terminal side according to some embodiments of the present disclosure.

Sidelink communication (direct communication) refers the communication between a device and another device that are close to each other is allowed. For ease of description, a link for the sidelink communication between a device and another device is defined as Sidelink (it can also be called direct link), and a wireless interface corresponding to the Sidelink is called a sidelink interface; a cellular communication link between the network and the device is called Uu link, and a corresponding interface is called Uu interface. As shown in FIG. 1.

The sidelink communication devices may all be in the network coverage or out of network coverage, or some devices may be in the network coverage and some devices may out of the network coverage. In the network coverage means that the sidelink communication device is located in the coverage of sidelink communication carriers in the 3rd Generation Partnership Project (3GPP); Out of the network coverage means that the sidelink communication device is not located in the coverage sidelink communication carriers in the 3rd Generation Partnership Project (3GPP).

Typical sidelink communication scenarios include the following three types.

A110. One-to-one communication (unicast) between sidelink communication devices;

A120. One device can send the same data to all devices in a communication group at one time (multicast);

A130. One device can send the same data to all nearby devices at one time (broadcast).

The sidelink communication link supports two resource allocation modes.

A210. Resource allocation mode scheduled by the network: that is, the mode in which the network allocates resources to the terminal according to the Sidelink Buffer state reporting (BSR) reported by the terminal. This resource allocation mode is also called Mode 3 in the LTE system.

A220. Resource allocation mode selected by the terminal: that is, the terminal selects one from pre-configured transmission resources or transmission resources broadcasted by the network for transmitting the sidelink communication link. This resource allocation mode is also called Mode 4 in the LTE system.

For the sidelink interface, if the terminal is on the network, no matter the resource allocation mode scheduled by the network or the resource allocation mode selected by the terminal is used, the resource used by the sidelink interface is controlled by the network. The network controls a resource pool allocated to the sidelink interface (resource allocation mode selected by the terminal) or a specific resource (resource allocation mode scheduled by the network) through the Uu interface. Therefore, it is collectively referred to as Uu-based resource allocation.

Vehicle-to-Everything (V2X) business data transmission path.

The V2X service can be transmitted through the sidelink interface or through the Uu interface. The selection of the service transmission path is determined by a higher layer (such as the service layer).

2. SL Resource Allocation Mode in the NR System

The sidelink interface in the NR system also supports two resource allocation modes.

The resource allocation mode scheduled by the network: that is, the mode in which the network allocates resources to the terminal according to the Sidelink Buffer state reporting (BSR) reported by the terminal. This resource allocation mode is also called Mode 1 in the NR system.

The resource allocation mode selected by the terminal: that is, the terminal selects one from pre-configured transmission resources or transmission resources broadcasted by the network for transmitting the sidelink communication link. This resource allocation mode is also called Mode 2 in the NR system.

It can be seen from the above definition that the Mode 1 resource allocation mode in the NR system and the Mode 3 resource allocation mode in the LTE system are essentially the same, and the Mode 2 resource allocation mode in the NR system and the Mode 4 resource allocation mode in the LTE system are essentially the same. They have the different names because the systems are different.

The present disclosure aims at the problem that in the LTE system in the related art, one resource allocation mode used on the sidelink interface of one terminal cannot meet the QoS requirements of the sidelink communication service in the NR system, and a resource allocation mode configuration method, a terminal and a network device are provided.

As shown in FIG. 2, the resource allocation mode configuration method according to an embodiment of the present disclosure is applied to a terminal and includes the following steps.

Step 21: receiving a resource allocation mode for a sidelink interface configured by a network device.

It should be noted that the resource allocation mode is configured by the network device for each target.

The target includes at least one of the following information.

A21. A radio bearer of the sidelink interface (Sidelink Radio Bearer, SLRB);

A22. Quality of service (QoS) parameters of the sidelink interface;

A23. A frequency band identifier;

Wherein, the frequency band identifier includes: a carrier, a frequency, or a bandwidth part (BWP).

A24. Radio Access Technology (RAT) used by the sidelink interface;

It should be noted that the types of RATs may include: NR, LTE, and so on.

Optionally, before the step 21, the resource allocation mode configuration method further includes: reporting terminal capability information to the network device.

It should be noted that the terminal capability information is used to indicate whether the terminal supports simultaneous use of a plurality of sidelink interface resource allocation modes.

Optionally, before the step 21, the resource allocation mode configuration method further includes: reporting auxiliary information to the network device.

It should be noted that the auxiliary information is reported based on one of the following information.

A31. QoS parameters of the sidelink interface;

It should be noted that, in this case, the terminal reports at least one of the following information.

A311. Values of all or part of the QoS parameters used by a current service on the sidelink interface of the terminal;

A312. identifiers of the QoS parameter used by the current service on the sidelink interface of the terminal.

A32. SLRB;

It should be noted that, in this case, the terminal separately reports at least one of the following information for each SLRB:

A321. Identification information of the SLRB;

A322. Identification information of RAT corresponding to the SLRB;

A323. A transmission frequency expected by the SLRB;

A324. A communication target corresponding to the SLRB;

A325. QoS parameters corresponding to the SLRB;

A326. Service characteristics of the SLRB;

Specifically, the service characteristics include: service cycle information and/or data packet size.

A33. Frequency band identifier or RAT used by the sidelink interface;

It should be noted that, in this case, the auxiliary information includes at least one of the following information.

A331. A identifier of the SLRB expected to be transmitted in the frequency band identifier and the RAT used by the sidelink interface;

A332. A number of SLRBs expected to be transmitted in the frequency band identifier and the RAT used by the sidelink interface;

A333. The QoS parameters of the SLRB expected to be transmitted in the frequency band identifier and the RAT used by the sidelink interface.

In some embodiments of the present disclosure, the terminal receives the resource allocation mode of the sidelink interface configured by the network device, when the terminal performs the sidelink communication service, the QoS requirement of the sidelink communication service can be guaranteed.

Figure 3:
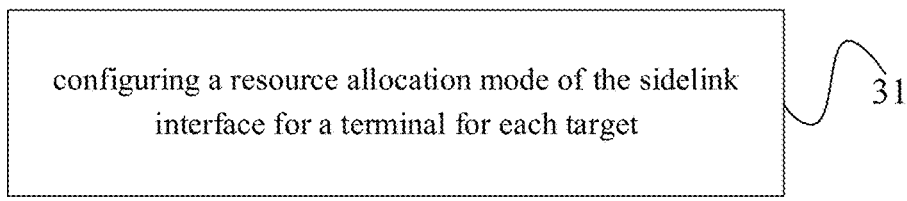
FIG. 3 shows a schematic flowchart of a resource allocation mode configuration method applied to a network device side according to some embodiments of the present disclosure.

As shown in FIG. 3, some embodiments of the present disclosure also provide a resource allocation mode configuration method, which is applied to a network device and includes the following steps.

Step 31: configuring a resource allocation mode of the sidelink interface for a terminal for each target;

It should be noted that the target includes at least one of the following information.

B1. A radio bearer of the sidelink interface (Sidelink Radio Bearer, SLRB);

B2. Quality of service (QoS) parameters of the sidelink interface;

B3. A frequency band identifier;

Wherein, the frequency band identifier includes: a carrier, a frequency, or a bandwidth part (BWP).

B4. Radio Access Technology (RAT) used by the sidelink interface;

Optionally, before the step 31, the resource allocation mode configuration method further includes: receiving terminal capability information reported by the terminal.

Specifically, the terminal capability information is used to indicate whether the terminal supports a plurality sidelink interface resource allocation modes at the same time.

It should be noted that the network device can determine whether to configure in step 31 for the terminal according to the terminal capability information; when the terminal capability information is used to indicate that the terminal can support a plurality of sidelink interface resource allocation modes at the same time, the configuration in step 31 is performed for the terminal, when the terminal capability information is used to indicate that the terminal cannot support the plurality of sidelink interface resource allocation modes at the same time, the configuration in step 31 is not performed for the terminal.

Optionally, before the step 31, the resource allocation mode configuration method further includes: receiving auxiliary information reported by the terminal.

Specifically, the auxiliary information is reported by the terminal based on one of the following information.

B11. QoS parameters of the sidelink interface;

It should be noted that, in this case, the terminal reports at least one of the following information.

B111. Values of all or part of the QoS parameters used by a current service on the sidelink interface of the terminal;

B112. Identifiers of the QoS parameter used by the current service on the sidelink interface of the terminal.

B12. SLRB;

It should be noted that, in this case, the terminal separately reports at least one of the following information for each SLRB:

B121. Identification information of the SLRB;

B122. Identification information of RAT corresponding to the SLRB;

B123. A transmission frequency expected by the SLRB;

B124. A communication target corresponding to the SLRB;

B125. QoS parameters corresponding to the SLRB;

B126. Service characteristics of the SLRB;

Specifically, the service characteristics include: service cycle information and/or data packet size.

B13. Frequency band identifier or RAT used by the sidelink interface;

It should be noted that, in this case, the auxiliary information includes at least one of the following information.

B131. A identifier of the SLRB expected to be transmitted in the frequency band identifier and the RAT used by the sidelink interface;

B132. A number of SLRBs expected to be transmitted in in the frequency band identifier and the RAT used by the sidelink interface;

B133. The QoS parameters of the SLRB expected to be transmitted in the frequency band identifier and the RAT used by the sidelink interface.

It should be noted that when the auxiliary information is reported by the terminal based on the QoS parameters of the sidelink interface, the network device usually configures the resource allocation mode of the sidelink interface for the terminal according to the QoS parameters of the sidelink interface. When the auxiliary information is reported by the terminal based on the SLRB, the network device can configure the resource allocation mode of the sidelink interface for the terminal according to the SLRB, the QoS parameters of the sidelink interface, the frequency band identifier, or the RAT used by the sidelink interface. When the auxiliary information is reported by the terminal based on the frequency band identifier, the network device usually configures the resource allocation mode of the sidelink interface for the terminal according to the frequency band identifier. When the auxiliary information is reported by the terminal based on the RAT used by the sidelink interface, the network device usually configures the resource allocation mode of the sidelink interface for the terminal according the RAT used by the sidelink interface.

The following specifically describes the implementation of some embodiments of the present disclosure from the perspective of different contents contained in the target.

1. The target includes the SLRB.

The configuration mode of the resource allocation mode includes one of the following modes.

C11. The resource allocation mode is configured based on each SLRB.

In this case, the resource allocation mode configured for the sidelink interface of the terminal includes one of the following modes.

C111: Based on each SLRB, a resource allocation mode corresponding to the SLRB is configured in radio resource control (RRC) signaling.

It should be noted that in this case, the RRC signaling carries the SLRB and the resource allocation mode corresponding to each SLRB.

C112. Based on each resource allocation mode, information of the SLRB allowed to use the resource allocation mode is given in the RRC signaling.

It should be noted that, in this case, the RRC signaling carries the resource allocation mode and the information of the SLRB that are allowed to use the resource allocation mode, and the information of the SLRB may be in the form of a table.

C12. The resource allocation mode is configured based on each SLRB, and is independently configured based on each frequency band identifier.

It should be noted that, in this case, the resource allocation modes for the same SLRB used on different frequency band identifiers may be different.

Specifically, the resource allocation mode for configuring the sidelink interface for the terminal includes one of the following modes.

C121, the RRC signaling carries identification information of the frequency band identifier, and based on each frequency band identifier, the resource allocation mode corresponding to each SLRB transmitted on the frequency band identifier is configured.

C122, the RRC signaling carries identification information of the frequency band identifier, and based on each frequency band identifier, the information of the SLRB allowed to use the resource allocation mode is configured for each resource allocation mode respectively.

It should be noted that the specific implementation of the above two cases is similar to the specific implementation in C11, and will not be repeated here.

C13. The resource allocation mode is configured based on each SLRB, and is independently configured based on each RAT.

It should be noted that, in this case, the resource allocation modes allowed to be used by the same SLRB on different RATs may be different.

Specifically, the resource allocation mode configured for the sidelink interface of the terminal includes one of the following modes.

C131. RRC signaling carries identification information of the RAT, and based on each RAT, the resource allocation mode corresponding to each SLRB transmitted on the RAT is respectively configured.

C132. RRC signaling carries the identification information of the RAT, and based on each RAT, for each resource allocation mode, the information of the SLRB allowed to use the resource allocation mode is respectively configured.

It should be noted that the specific implementation of the above two cases is similar to the specific implementation in C11, and will not be repeated here.

C14. The resource allocation mode is configured based on each SLRB, and is independently configured based on each frequency band identifier of each RAT.

It should be noted that, in this case, the resource allocation modes allowed used by the same SLRB on different frequency band identifiers and different RATs may be different.

Specifically, the resource allocation mode configured for the sidelink interface of the terminal includes one of the following mode.

C141. RRC signaling carries the identification information of the RAT and the identification information of the frequency band identifier, and based on each frequency band identifier of each RAT, the resource allocation mode corresponding to each SLRB transmitted on the RAT is respectively configured.

C142. RRC signaling carries the identification information of the RAT and the identification information of the frequency band identifier, based on each frequency band identification of each RAT, for each resource allocation mode, the information of the SLRB allowed to use the resource allocation mode is respectively configured.

It should be noted that the specific implementation of the above two cases is similar to the specific implementation in C11, and will not be repeated here.

2. The target includes the QoS parameters of the sidelink interface.

The configuration mode of the resource allocation mode includes one of the following modes.

D1. The resource allocation mode is configured based on different value combinations of all QoS parameters;

D2. The resource allocation mode is configured based on different value combinations of all QoS parameters, and is independently configured based on each frequency band identifier;

D3. The resource allocation mode is configured based on different value combinations of all QoS parameters, and is configured independently based on each RAT;

D4. The resource allocation mode is configured based on different value combinations of all QoS parameters, and is independently configured based on each frequency band identifier of each RAT;

D5. The resource allocation mode is configured based on different value combinations of part of QoS parameters;

D6. The resource allocation mode is configured based on different value combinations of part of QoS parameters, and is independently configured based on each frequency band identifier;

D7. The resource allocation mode is configured based on different value combinations of part of QoS parameters, and is independently configured based on each RAT;

D8. The resource allocation mode is configured based on different value combinations of part of QoS parameters, and is independently configured based on each frequency band identifier of each RAT.

3. The target includes the frequency band identifier

The implementation of the resource allocation mode configured for the sidelink interface of the terminal is as follows.

The first RRC signaling carries frequency band identification information, and a resource allocation mode corresponding to the frequency band identifier is configured based on each frequency band identification.

Further, the further implementation of configuring the resource allocation mode for the sidelink interface of the terminal is as follows.

The first RRC signaling carries frequency band identification information, and based on each frequency band identification, for each resource allocation mode, information of SLRB allowed to use the resource allocation mode is respectively configured.

4. The target includes the RAT

The implementation mode of configuring the resource allocation mode for the sidelink interface of the terminal is as follows:

The second RRC signaling carries RAT information, and the resource allocation mode corresponding to the RAT is configured based on each RAT.

Further, the further implementation manner of configuring the resource allocation mode of the sidelink interface for the terminal is as follows.

The second RRC signaling carries RAT information, and based on each RAT, for each resource allocation mode, information of SLRB allowed to use the resource allocation mode are respectively configured.

The following is a detailed description of the application conditions of the foregoing embodiments in actual applications as follows.

Condition 1

Figure 4:
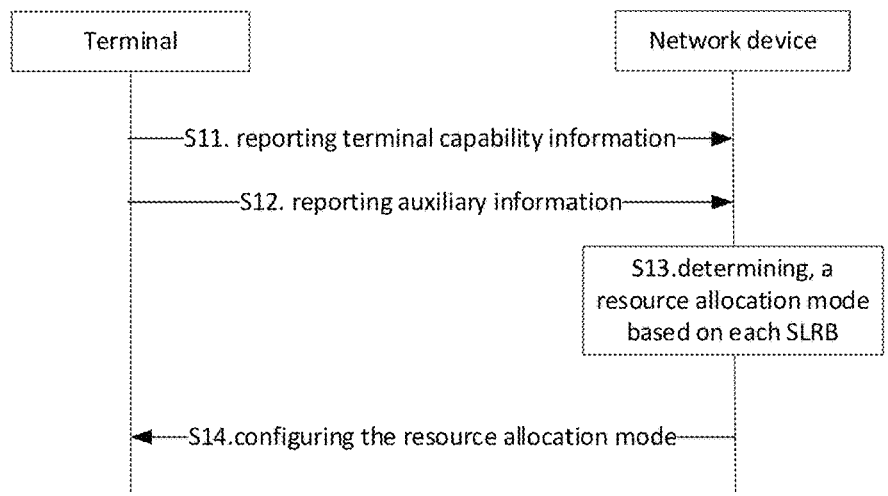
FIG. 4 shows the first schematic diagram of a specific implementation process according to some embodiments of the present disclosure.

As shown in FIG. 4, the specific implementation process of some embodiments of the present disclosure is as follows.

Step S11, reporting terminal capability information.

The terminal reports terminal capability information to the network device, and the terminal capability information includes at least capability indication information of whether the terminal supports the simultaneous use of a plurality of sidelink interface resource allocation modes.

Step S12, reporting, by the terminal, auxiliary information.

The terminal reports auxiliary information to the network device, and the auxiliary information is reported based on the SLRB, and one or a combination of the following information is reported for each SLRB:

M11, identification information of the SLRB;
M12, identification information of the RAT corresponding to the SLRB;
M13, a transmission frequency expected by the SLRB;
M14, a communication target corresponding to the SLRB;
M15, QoS parameters corresponding to the SLRB;
M16, service characteristics of the SLRB, the service characteristics include: service cycle information and/or data packet size.

Step S13, determining, by the network device, a resource allocation mode based on each SLRB.

When the network device determines the resource allocation mode based on each SLRB, it may not distinguish between the frequency band identifier and the RAT, and the resource allocation mode is only determined according to the service requirements of the SLRB.

Step S14, configuring the resource allocation mode.

The resource allocation mode is configured by using RRC signaling, and the specific signaling can be in the following two modes.

Mode 1: in RRC signaling, the resource allocation mode corresponding to each SLRB is configured based on the SLRB The specific configuration method is shown in Table 1.

TABLE 1 corresponding relationship between SLRB identifier and resource allocation mode identifier

| SLRB identifier | resource allocation mode identifier |
|---|---|
| SLRB 1 | resource allocation mode scheduled by the network |
| SLRB 2 | resource allocation mode selected by the terminal |
| SLRB3 | resource allocation mode scheduled by the network |

Mode 2: in the RRC signaling, based on each resource allocation mode, a list of SLRBs allowed to use the resource allocation mode is given.

The specific configuration method is shown in Table 2.

TABLE 2 corresponding relationship between resource allocation mode identifier and SLRB list

| resource allocation mode identifier | SLRB list |
|---|---|
| resource allocation mode scheduled by the network | SLRB1; SLRB3 |
| resource allocation mode selected by the terminal | SLRB2 |

Condition 2

As shown in FIG. 4, the specific implementation process of some embodiments of the present disclosure is as follows.

Step S11, reporting terminal capability information.

The terminal reports terminal capability information to the network device, and the terminal capability information includes at least capability indication information of whether the terminal supports the simultaneous use of a plurality of sidelink interface resource allocation modes.

Step S12, reporting, by the terminal, auxiliary information.

The terminal reports auxiliary information to the network device, and the auxiliary information is reported based on the SLRB, and one or a combination of the following information is reported for each SLRB:

M11, identification information of the SLRB;
M12, identification information of the RAT corresponding to the SLRB;
M13, a transmission frequency expected by the SLRB;
M14, a communication target corresponding to the SLRB;
M15, QoS parameters corresponding to the SLRB;
M16, service characteristics of the SLRB, the service characteristics include: service cycle information and/or data packet size.

Step S13, determining, by the network device, a resource allocation mode based on each SLRB.

When the network device determines the resource allocation mode based on each SLRB, the difference from condition 1 is that the network device needs to distinguish the frequency band identifier when determining the resource allocation mode of each SLRB, and determine the resource allocation mode corresponding to each SLRB allowed to use the frequency band identifier based on each frequency band identifier.

Step S14, configuring the resource allocation mode.

The resource allocation mode is configured by using RRC signaling, and the specific signaling can be in the following two modes.

Mode 1: the RRC signaling carriers the frequency band identifier, and based on each frequency band identification, the resource allocation mode corresponding to each SLRB that can be transmitted on the frequency band identification is configured.

The frequency band identifier is taken as a carrier or a frequency for example, and the specific configuration method is shown in Table 3.

TABLE 3

Corresponding relationship among carrier/frequency pint identifier, SLRB identifier and resource allocation mode identifier

| Carrier/frequency identifier | SLRB identifier | resource allocation mode identifier |
| --- | --- | --- |
| Frequency/ carrier 1 | SLRB 1 | resource allocation mode scheduled by the network |
|  | SLRB 2 | resource allocation mode selected by the terminal |
|  | SLRB3 | resource allocation mode scheduled by the network |
| Frequency/ carrier 1 | SLRB 1 | resource allocation mode scheduled by the network |
|  | SLRB 4 | resource allocation mode selected by the terminal |

Mode 2: The RRC signaling carries the identification information of the frequency band identifier, and then based on each frequency band identifier, a list of all SLRBs that are allowed to use a specific resource allocation mode is configured.

The specific configuration method is shown in Table 4.

TABLE 4

Corresponding relationship among carrier/frequency identifier, resource allocation mode identifier and SLRB list

| Carrier/frequency identifier | resource allocation mode identifier | SLRB list |
| --- | --- | --- |
| Frequency/ carrier 1 | resource allocation mode scheduled by the network | SLRB1; SLRB3 |
|  | resource allocation mode selected by the terminal | SLRB2 |
| Frequency/ carrier 1 | resource allocation mode scheduled by the network | SLRB1 |
|  | resource allocation mode selected by the terminal | SLRB4 |

Condition 3

As shown in FIG. 4, the specific implementation process of some embodiments of the present disclosure is as follows.

Step S11, reporting terminal capability information.

The terminal reports terminal capability information to the network device, and the terminal capability information includes at least capability indication information of whether the terminal supports the simultaneous use of a plurality of sidelink interface resource allocation modes.

Step S12, reporting, by the terminal, auxiliary information.

The terminal reports auxiliary information to the network device, and the auxiliary information is reported based on the SLRB, and one or a combination of the following information is reported for each SLRB:

M11, identification information of the SLRB;
M12, identification information of the RAT corresponding to the SLRB;
M13, a transmission frequency expected by the SLRB;
M14, a communication target corresponding to the SLRB;
M15, QoS parameters corresponding to the SLRB;
M16, service characteristics of the SLRB, the service characteristics include: service cycle information and/or data packet size.

Step S13, determining, by the network device, a resource allocation mode based on each SLRB.

When the network device determines the resource allocation mode based on each SLRB, the difference from condition 1 is that the network device needs to distinguish the frequency band identifier when determining the resource allocation mode of each SLRB, and determine the resource allocation mode corresponding to each SLRB allowed to use the frequency band identifier based on each frequency band identifier.

Step S14, configuring the resource allocation mode.

The resource allocation mode is configured by using RRC signaling, and the specific signaling can be in the following two modes.

Mode 1: The RRC signaling carries the RAT identification information, and then based on each RAT, the resource allocation mode corresponding to each SLRB that can be transmitted on the RAT is configured.

The specific configuration method is shown in Table 5.

TABLE 5 corresponding relationship among the RAT identifier, SLRB identifier and resource allocation mode identifier

| RAT identifier | SLRB identifier | resource allocation mode identifier |
| --- | --- | --- |
| RAT 1 (for example NF) | SLRB 1 | resource allocation mode scheduled by the network |
|  | SLRB 2 | resource allocation mode selected by the terminal |
|  | SLRB3 | resource allocation mode scheduled by the network |
| RAT 2 (for example LTE) | SLRB 1 | resource allocation mode scheduled by the network |
|  | SLRB 4 | resource allocation mode selected by the terminal |

Mode 2: RRC signaling carries the RAT identification information, and based on each RAT, a list of all SLRBs allowed to use a specific resource allocation mode is configured.

The specific configuration method is shown in Table 6.

TABLE 6

Corresponding relationship among the RAT identifier, resource allocation mode identifier and SLRB list

| RAT identifier | resource allocation mode identifier | SLRB list |
| --- | --- | --- |
| RAT 1 (for example NF) | resource allocation mode scheduled by the network | SLRB1; SLRB3 |
|  | resource allocation mode selected by the terminal | SLRB2 |

TABLE 6-continued

Corresponding relationship among the RAT identifier,
resource allocation mode identifier and SLRB list

| RAT identifier | resource allocation mode identifier | SLRB list |
|---|---|---|
| RAT 2 (for example LTE) | resource allocation mode scheduled by the network | SLRB1 |
|  | resource allocation mode selected by the terminal | SLRB4 |

Condition 4

As shown in FIG. 4, the specific implementation process of some embodiments of the present disclosure is as follows.

Step S11, reporting terminal capability information.

The terminal reports terminal capability information to the network device, and the terminal capability information includes at least capability indication information of whether the terminal supports the simultaneous use of a plurality of sidelink interface resource allocation modes.

Step S12, reporting, by the terminal, auxiliary information.

The terminal reports auxiliary information to the network device, and the auxiliary information is reported based on the SLRB, and one or a combination of the following information is reported for each SLRB:

M11, identification information of the SLRB;

M12, identification information of the RAT corresponding to the SLRB;

M13, a transmission frequency expected by the SLRB;

M14, a communication target corresponding to the SLRB;

M15, QoS parameters corresponding to the SLRB;

M16, service characteristics of the SLRB, the service characteristics include: service cycle information and/or data packet size.

Step S13, determining, by the network device, a resource allocation mode based on each SLRB.

When the network device determines the resource allocation mode based on each SLRB, the difference from Case 1 is that the network device needs to distinguish between the RAT and each frequency band identifier corresponding to the RAT when determining the resource allocation mode of each SLRB, based on each frequency band identifier of each RAT, the resource allocation mode corresponding to each SLRB allowed to use the RAT is determined respectively.

Step S14, configuring the resource allocation mode.

The resource allocation mode is configured by using RRC signaling, and the specific signaling can be in the following two modes.

Mode 1: The RRC signaling carries the identification information of the RAT identifier and the frequency band identifier, and based on each frequency band identifier of each RAT, the resource allocation mode corresponding to each SLRB that can be transmitted on the RAT is configured respectively.

The frequency band identifier is taken as a carrier or a frequency as an example. The specific configuration is shown in Table 7.

TABLE 7

Corresponding relationship among the RAT identifier, carrier/frequency
identifier, SLRB identifier and resource allocation mode identifier

| RAT identifier | Carrier/frequency identifier | SLRB identifier | resource allocation mode identifier |
|---|---|---|---|
| RAT 1 (for example NF) | Frequency/carrier 1 | SLRB 1 | resource allocation mode scheduled by the network |
|  |  | SLRB 2 | resource allocation mode selected by the terminal |
|  |  | SLRB3 | resource allocation mode scheduled by the network |
| RAT 2 (for example LTE) | Frequency/carrier 2 | SLRB 1 | resource allocation mode scheduled by the network |
|  |  | SLRB 4 | resource allocation mode selected by the terminal |

Mode 2: The RRC signaling carries the RAT identification information and the identification information of the frequency band identifier, and based on each frequency band identifier of each RAT, a list of all SLRBs allowed to use a specific resource allocation mode is configured.

The specific configuration method is shown in Table 8.

TABLE 8

Corresponding relationship among the RAT identifier, carrier/frequency
identifier, resource allocation mode identifier and SLRB list

| RAT identifier | Carrier/frequency identifier | resource allocation mode identifier | SLRB identifier |
|---|---|---|---|
| RAT 1 (for example NF) | Frequency/carrier 1 | resource allocation mode scheduled by the network | SLRB 1 |
|  |  | resource allocation mode selected by the terminal | SLRB 2 |

TABLE 8-continued

Corresponding relationship among the RAT identifier, carrier/frequency
identifier, resource allocation mode identifier and SLRB list

| RAT identifier | Carrier/frequency identifier | resource allocation mode identifier | SLRB identifier |
|---|---|---|---|
| | | resource allocation mode scheduled by the network | SLRB3 |
| RAT 2 (for example LTE) | Frequency/ carrier 2 | resource allocation mode scheduled by the network | SLRB 1 |
| | | resource allocation mode selected by the terminal | SLRB 4 |

Condition 5

Figure 5:
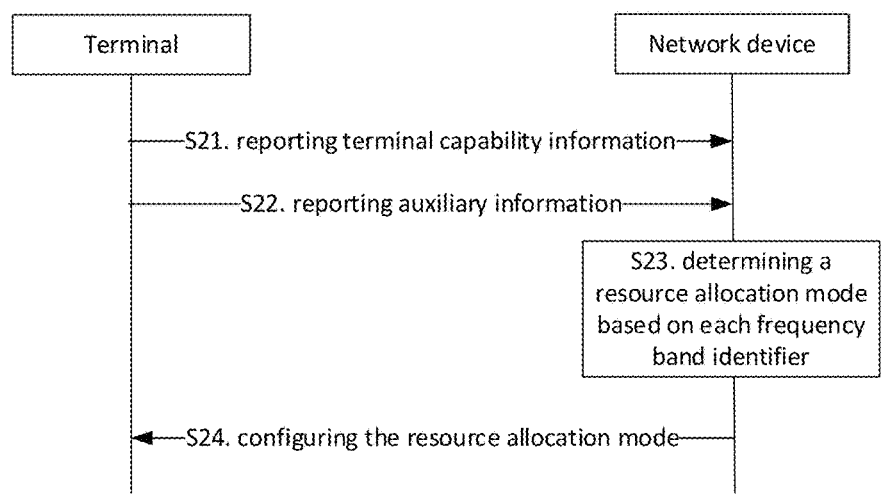
FIG. 5 shows the second schematic diagram of a specific implementation process according to some embodiments of the present disclosure.

As shown in FIG. 5, the specific implementation process of some embodiments of the present disclosure is as follows.

Step S21, reporting terminal capability information.

The terminal reports terminal capability information to the network device, and the terminal capability information includes at least capability indication information of whether the terminal supports the simultaneous use of a plurality of sidelink interface resource allocation modes.

Step S22, reporting, by the terminal, auxiliary information.

The terminal reports auxiliary information to the network device, and the auxiliary information is reported based on the SLRB, and one or a combination of the following information is reported for each SLRB:

M21, identification information of the SLRB;

M22, identification information of the RAT corresponding to the SLRB;

M23, a transmission frequency expected by the SLRB;

M24, a communication target corresponding to the SLRB;

M25, QoS parameters corresponding to the SLRB;

M26, service characteristics of the SLRB, the service characteristics include: service cycle information and/or data packet size.

Alternatively, the terminal reports auxiliary information to the network device, and the auxiliary information is reported based on the frequency band identifier (carrier/frequency/BWP), and the content includes one or a combination of the following:

M31. The identifier of the SLRB expected to be transmitted in the frequency band identifier;

M32. A number of SLRBs expected to be transmitted in the frequency band identifier;

M33. QoS parameters of the SLRB expected to be transmitted in the frequency band identifier;

Step S23: determining, by the network device, a resource allocation mode based on each frequency band identifier.

The network device determines the resource allocation mode based on each frequency band identifier. Optionally, the SLRB allowed to use the resource allocation mode on the frequency band identifier is further determined.

Step S24, configuring the resource allocation mode.

It should be noted that the resource allocation mode can be configured by using RRC signaling.

If the network device only determines the resource allocation mode based on each frequency band identifier, the SLRB allowed to use the frequency band identifier is not determined. The frequency band identifier is taken as a carrier or frequency as an example. The specific configuration method is shown in Table 9:

TABLE 9

Corresponding relationship between carrier/frequency
identifier and resource allocation mode identifier

| Carrier/frequency identifier | resource allocation mode identifier |
|---|---|
| Frequency/ carrier 1 | resource allocation mode scheduled by the network |
| Frequency/ carrier 2 | resource allocation mode selected by the terminal |

If the network device only determines the resource allocation mode based on each frequency band identifier, the SLRB allowed to use the resource allocation mode on the frequency band identifier is further determined. The specific configuration method is shown in Table 10:

TABLE 10

Corresponding relationship among the carrier/frequency identifier,
resource allocation mode identifier and SLRB list

| Carrier/frequency identifier | resource allocation mode identifier | SLRB list |
|---|---|---|
| Frequency/ carrier 1 | resource allocation mode scheduled by the network | SLRB 1 SLRB3 |
| Frequency/ carrier 2 | resource allocation mode selected by the terminal | SLRB2 |

Condition 6

Figure 6:
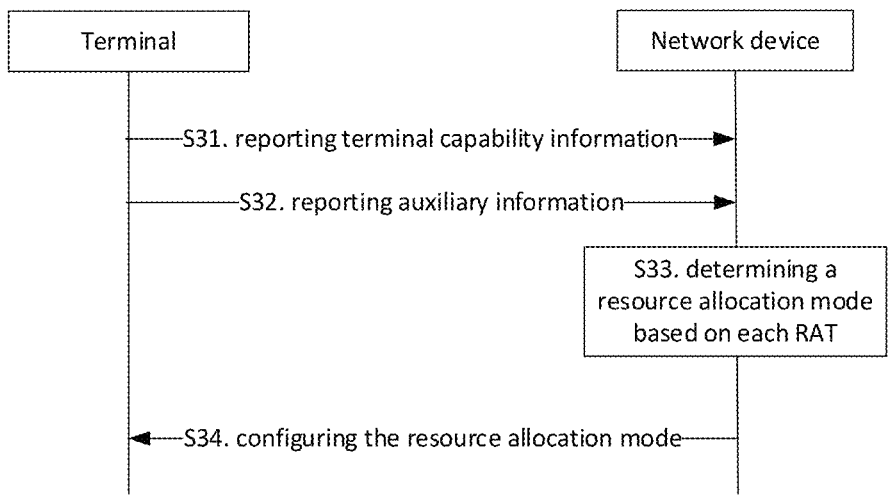
FIG. 6 shows the third schematic diagram of a specific implementation process according to some embodiments of the present disclosure.

As shown in FIG. 6, the specific implementation process of some embodiments of the present disclosure is as follows.

Step S31, reporting terminal capability information.

The terminal reports terminal capability information to the network device, and the terminal capability information includes at least capability indication information of whether the terminal supports the simultaneous use of a plurality of sidelink interface resource allocation modes.

Step S22, reporting, by the terminal, auxiliary information.

The terminal reports auxiliary information to the network device, and the auxiliary information is reported based on the SLRB, and one or a combination of the following information is reported for each SLRB:

M41, identification information of the SLRB;

M42, identification information of the RAT corresponding to the SLRB;

M43, a transmission frequency expected by the SLRB;

M44, a communication target corresponding to the SLRB;

M45, QoS parameters corresponding to the SLRB;

M46, service characteristics of the SLRB, the service characteristics include: service cycle information and/or data packet size.

Alternatively, the terminal reports auxiliary information to the network device, and the auxiliary information is reported based on the RAT, and the content includes one or a combination of the following:

M51. The identifier of the SLRB expected to be transmitted on the RAT used by the sidelink interface;

M52. A number of SLRBs expected to be transmitted on the RAT used by the sidelink interface;

M53. QoS parameters of the SLRB expected to be transmitted on the RAT used by the sidelink interface;

Step S33: determining, by the network device, a resource allocation mode based on each RAT.

The network device determines the resource allocation mode based on each RAT. Optionally, the SLRB allowed to use the resource allocation mode on the frequency band identifier corresponding to the RAT is further determined.

Step S34, configuring the resource allocation mode.

It should be noted that the resource allocation mode can be configured by using RRC signaling.

If the network device only determines the resource allocation mode based on each RAT, there is no restriction for the SLRB that can use that frequency. The specific configuration method is shown in Table 11.

TABLE 11

Corresponding relationship between the RAT identifier and resource allocation mode identifier

| RAT identifier | resource allocation mode identifier |
|---|---|
| RAT 1 (for example NR) | resource allocation mode scheduled by the network |
| RAT 2 (for example LTE) | resource allocation mode selected by the terminal |

If the network device only determines the resource allocation mode based on each RAT, there is further restriction for the SLRB allowed to use the resource allocation mode on the RAT. The specific configuration mode is shown in Table 12.

TABLE 12

Corresponding relationship among the RAT identifier, resource allocation mode identifier and SLRB list

| RAT identifier | resource allocation mode identifier | SLRB list |
|---|---|---|
| RAT 1 (for example NR) | resource allocation mode scheduled by the network | SLRB 1 SLRB3 |
| RAT 2 (for example LTE) | resource allocation mode selected by the terminal | SLRB2 |

Condition 7

Figure 7:
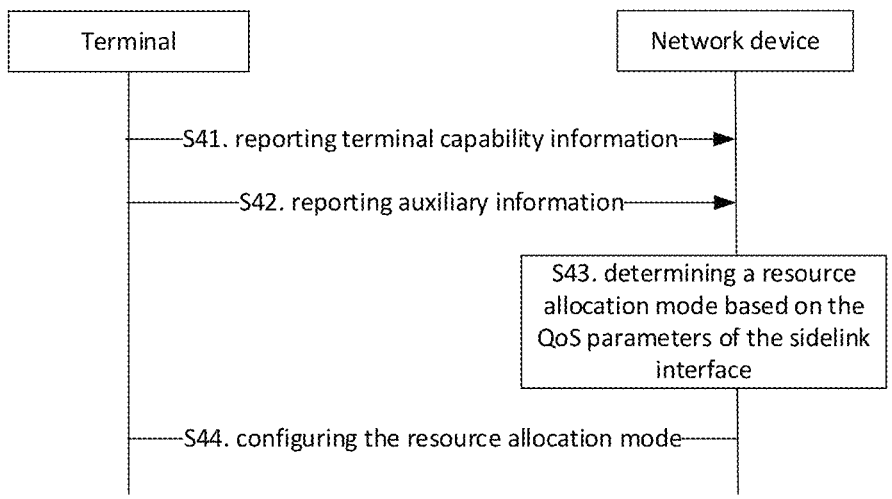
FIG. 7 shows the fourth schematic diagram of a specific implementation process according to some embodiments of the present disclosure.

As shown in FIG. 7, the specific implementation process of some embodiments of the present disclosure is:

Step S41, reporting terminal capability information.

The terminal reports terminal capability information to the network device, and the terminal capability information includes at least capability indication information of whether the terminal supports the simultaneous use of a plurality of sidelink interface resource allocation modes.

Step S42, reporting, by the terminal, auxiliary information.

The terminal reports auxiliary information to the network device, and the auxiliary information is reported based on the SLRB, and one or a combination of the following information is reported for each SLRB:

M61, identification information of the SLRB;

M62, identification information of the RAT corresponding to the SLRB;

M63, a transmission frequency expected by the SLRB;

M64, a communication target corresponding to the SLRB;

M65, QoS parameters corresponding to the SLRB;

M66, service characteristics of the SLRB, the service characteristics include: service cycle information and/or data packet size.

Alternatively, the terminal reports auxiliary information to the network device, and the auxiliary information is reported based on the QoS parameters of the sidelink interface, and the content includes one or a combination of the following:

M71. Values of all or part of the QoS parameters used by a current service on the sidelink interface of the terminal;

A312. identifiers of the QoS parameter used by the current service on the sidelink interface of the terminal.

Step S43: determining, by the network device, a resource allocation mode based on the QoS parameters of the sidelink interface;

Specifically, the network device can be determined in the following modes.

M81. The resource allocation mode is configured based on different value combinations of all QoS parameters;

M82. The resource allocation mode is configured based on different value combinations of all QoS parameters, and is independently configured based on each frequency band identifier;

M83. The resource allocation mode is configured based on different value combinations of all QoS parameters, and is independently configured based on each RAT;

M84. The resource allocation mode is configured based on different value combinations of all QoS parameters, and is configured independently based on each frequency band identifier of each RAT;

M85. The resource allocation mode is configured based on different value combinations of part of QoS parameters;

M86. The resource allocation mode is configured based on different value combinations of part of QoS parameters, and is independently configured based on each frequency band identifier;

M87. The resource allocation mode is configured based on different value combinations of part of QoS parameters, and is configured independently for each RAT;

M88. The resource allocation mode is configured based on different value combinations of part of QoS parameters, and is configured independently based on each frequency band identifier of each RAT.

Step S44, configuring the resource allocation mode.

It should be noted that the resource allocation mode can be configured using RRC signaling.

For example, when the above-mentioned M81 is used for configuration, an optional configuration method is shown in Table 13.

TABLE 13

Corresponding relationship between the value combinations of all QoS parameters and the resource allocation mode identifier

| Value combination of all QoS parameters | resource allocation mode identifier |
|---|---|
| Value combination 1 | resource allocation mode scheduled by the network |
| Value combination 2 | resource allocation mode selected by the terminal |

For example, when the above-mentioned M85 is used for configuration, an optional configuration method is shown in Table 14, where 5QI or VQI is a QoS label, the QoS label corresponds to part of parameters in the V2X QoS parameters, such as delay and packet loss rate, etc.

TABLE 14

Corresponding relationship between the value combinations of part of QoS parameters and the resource allocation mode identifier

| Value combination of part of QoS parameters (for example, 5QI or VQI (V2X QoS Identifier)) | resource allocation mode identifier |
|---|---|
| Value combination 1 | resource allocation mode scheduled by the network |
| Value combination 2 | resource allocation mode selected by the terminal |

It should be noted that the foregoing embodiments of the present disclosure flexibly configure the resource allocation mode for the terminal through the network device, and when the terminal performs the sidelink communication service, the QoS requirement of the sidelink communication service can be guaranteed.

Figure 8:
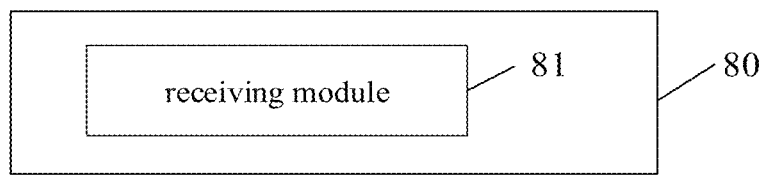
FIG. 8 shows a schematic diagram of modules of a terminal according to some embodiments of the present disclosure.

As shown in FIG. 8, some embodiments of the present disclosure provide a terminal 80, including: a receiving module 81, configured to receive a resource allocation mode for a sidelink interface configured by a network device.

Wherein, the resource allocation mode is configured by the network device for each target.

The target includes at least one of the following information:
A radio bearer of the sidelink interface (Sidelink Radio Bearer, SLRB);
Quality of service (QoS) parameters of the sidelink interface;
A frequency band identifier;
RAT used by the sidelink interface.

Wherein, the frequency band identifier includes: a carrier, a frequency, or a bandwidth part (BWP).

Optionally, before the receiving module 81 receives the resource allocation mode of the sidelink interface configured by the network device, the terminal further includes: a first reporting module, configured to report terminal capability information to the network device.

Specifically, the terminal capability information is used to indicate whether the terminal supports simultaneous use of a plurality of sidelink interface resource allocation modes.

Optionally, before the receiving module 81 receives the resource allocation mode of the sidelink interface configured by the network device, the terminal further includes: a second reporting module, configured to report auxiliary information to the network device.

Specifically, the auxiliary information is reported based on one of the following information:
QoS parameters of the sidelink interface;
SLRB;
Frequency band identifier or RAT used by the sidelink interface.

Further, when the auxiliary information is reported based on the QoS parameters of the sidelink interface, the terminal reports at least one of the following information:
Values of all or part of the QoS parameters used by a current service on the sidelink interface of the terminal;
Identifiers of the QoS parameter used by the current service on the sidelink interface of the terminal.

Further, when the auxiliary information is reported based on the SLRB, the terminal separately reports at least one of the following information for each SLRB:
Identification information of the SLRB;
Identification information of RAT corresponding to the SLRB;
A transmission frequency expected by the SLRB;
A communication target corresponding to the SLRB;
QoS parameters corresponding to the SLRB;
Service characteristics of the SLRB.

Specifically, the service characteristics include: service cycle information and/or data packet size.

Further, when the auxiliary information is reported based on the frequency band identifier or the RAT used by the sidelink interface, the auxiliary information includes at least one of the following information:
A identifier of the SLRB expected to be transmitted in the frequency band identifier and the RAT used by the sidelink interface;
A number of SLRBs expected to be transmitted in the frequency band identifier and the RAT used by the sidelink interface;
The QoS parameters of the SLRB expected to be transmitted in the frequency band identifier and the RAT used by the sidelink interface.

It should be noted that this terminal embodiment is corresponding to the foregoing method embodiment in a one-to-one manner, and all implementation in the foregoing method embodiment are applicable to the terminal embodiment, and the same technical effect can also be achieved.

Figure 9:
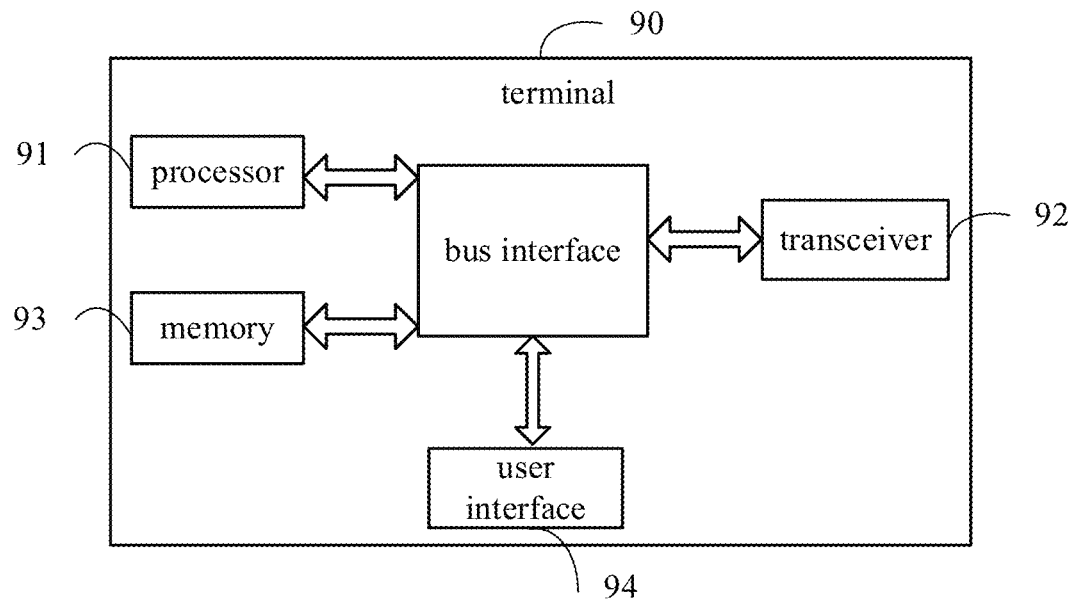
FIG. 9 shows a structural diagram of a terminal according to some embodiments of the present disclosure.

As shown in FIG. 9, some embodiments of the present disclosure also provide a terminal 90, including a processor 91, a transceiver 92, a memory 93, and a program stored on the memory 93 and executed by the processor 91. Wherein, the transceiver 92 is connected to the processor 91 and the memory 93 through a bus interface, the processor 91 is used to read the program in the memory and execute the following process: receiving a resource allocation mode for a sidelink interface configured by a network device.

Wherein, the resource allocation mode is configured by the network device for each target.

The target includes at least one of the following information:
A radio bearer of the sidelink interface (Sidelink Radio Bearer, SLRB);
Quality of service (QoS) parameters of the sidelink interface;
A frequency band identifier;
RAT used by the sidelink interface.

Wherein, the frequency band identifier includes: a carrier, a frequency, or a bandwidth part (BWP).

It should be noted that, in FIG. 9, the bus architecture may include any number of interconnected buses and bridges. Specifically, various circuits of one or more processors represented by the processor 91 and the memory represented by the memory 93 are linked together. The bus architecture can also link various other circuits such as peripheral devices, voltage regulators, power management circuits, etc., which are all known in the art, and therefore, no further description will be given herein. The bus interface provides the interface. The transceiver 92 may be a plurality of elements, including a transmitter and a transceiver, and provide a unit for communicating with various other devices on a transmission medium. For different terminals, the user interface 94 may also be an interface capable of connecting externally and internally with required device. The connected device includes but not limited to a keypad, a display, a speaker, a microphone, a joystick, and the like. The processor 91 is responsible for managing the bus architecture and general processing, and the memory 93 can store data used by the processor 91 when performing operations.

Optionally, the processor further implements the following steps when executing the program: reporting terminal capability information to the network device through the transceiver 92.

Specifically, the terminal capability information is used to indicate whether the terminal supports simultaneous use of a plurality of sidelink interface resource allocation modes.

Optionally, the processor implements the following steps when executing the program: reporting auxiliary information to the network device through the transceiver 92.

Specifically, the auxiliary information is reported based on one of the following information:
QoS parameters of the sidelink interface;
SLRB;
Frequency band identifier or RAT used by the sidelink interface.

Further, when the auxiliary information is reported based on the QoS parameters of the sidelink interface, the terminal reports at least one of the following information:
Values of all or part of the QoS parameters used by a current service on the sidelink interface of the terminal;
Identifiers of the QoS parameter used by the current service on the sidelink interface of the terminal.

Further, when the auxiliary information is reported based on the SLRB, the terminal separately reports at least one of the following information for each SLRB:
Identification information of the SLRB;
Identification information of RAT corresponding to the SLRB;
A transmission frequency expected by the SLRB;
A communication target corresponding to the SLRB;
QoS parameters corresponding to the SLRB;
Service characteristics of the SLRB.

Specifically, the service characteristics include: service cycle information and/or data packet size.

Further, when the auxiliary information is reported based on the frequency band identifier or the RAT used by the sidelink interface, the auxiliary information includes at least one of the following information:
A identifier of the SLRB expected to be transmitted in the frequency band identifier and the RAT used by the sidelink interface;
A number of SLRBs expected to be transmitted in the frequency band identifier and the RAT used by the sidelink interface;
The QoS parameters of the SLRB expected to be transmitted in the frequency band identifier and the RAT used by the sidelink interface.

Some embodiments of the present disclosure also provide a computer-readable storage medium on which a computer program is stored, wherein the processor execute the computer program to implement the steps of the resource allocation mode configuration method applied to the terminal.

Figure 10:
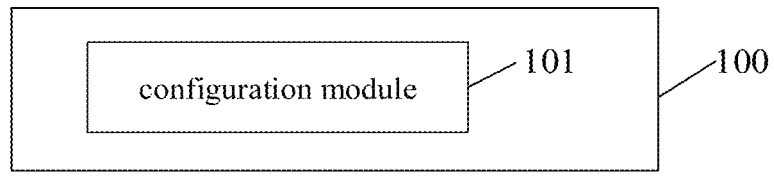
FIG. 10 shows a schematic diagram of modules of a network device according to some embodiments of the present disclosure.

As shown in FIG. 10, some embodiments of the present disclosure provide a network device 100, including: a configuration module 101, configured to configure a resource allocation mode of a sidelink interface for a terminal for each target.

The target includes at least one of the following information:
A radio bearer of the sidelink interface (Sidelink Radio Bearer, SLRB);
Quality of service (QoS) parameters of the sidelink interface;
A frequency band identifier;
Radio Access Technology (RAT) used by the sidelink interface.

Wherein, the frequency band identifier includes: a carrier, a frequency, or a bandwidth part (BWP).

Optionally, before the configuration module 101 configures the resource allocation mode of the sidelink interface for the terminal for each target, the network device further includes: a capability information receiving module, configured to receive terminal capability information reported by the terminal.

Specifically, the terminal capability information is used to indicate whether the terminal supports simultaneous use of multiple sidelink interface resource allocation modes.

Optionally, before the configuration module 101 configures the resource allocation mode of the sidelink interface for the terminal for each target, the network device further includes: an auxiliary information receiving module, configured to receive auxiliary information reported by the terminal.

Specifically, the auxiliary information is reported by the terminal based on one of the following information:
QoS parameters of the sidelink interface;
SLRB;
Frequency band identifier or RAT used by the sidelink interface.

Further, when the auxiliary information is reported by the terminal based on the QoS parameters of the sidelink interface, the terminal reports at least one of the following information:
Values of all or part of the QoS parameters used by a current service on the sidelink interface of the terminal;
Identifiers of the QoS parameter used by the current service on the sidelink interface of the terminal.

Further, when the auxiliary information is reported based on the SLRB, the terminal separately reports at least one of the following information for each SLRB:
Identification information of the SLRB;
Identification information of RAT corresponding to the SLRB;
A transmission frequency expected by the SLRB;
A communication target corresponding to the SLRB;
QoS parameters corresponding to the SLRB;
Service characteristics of the SLRB.

Specifically, the service characteristics include: service cycle information and/or data packet size.

Further, when the auxiliary information is reported based on the frequency band identifier or the RAT used by the sidelink interface, the auxiliary information includes at least one of the following information:
A identifier of the SLRB expected to be transmitted in the frequency band identifier and the RAT used by the sidelink interface;

A number of SLRBs expected to be transmitted in in the frequency band identifier and the RAT used by the sidelink interface;

The QoS parameters of the SLRB expected to be transmitted in the frequency band identifier and the RAT used by the sidelink interface.

Optionally, when the target includes SLRB, the configuration mode of the resource allocation mode includes one of the following modes:

The resource allocation mode is configured based on each SLRB.

The resource allocation mode is configured based on each SLRB, and is independently configured based on each frequency band identifier.

The resource allocation mode is configured based on each SLRB, and is independently configured based on each RAT.

The resource allocation mode is configured based on each SLRB, and is independently configured based on each frequency band identifier of each RAT.

The resource allocation mode is based on each SLRB configuration, and is independently configured based on each frequency band identifier of each RAT.

Further, when the resource allocation mode is configured based on each SLRB, the configuration module 101 is used to implement one of the following methods:

Based on each SLRB, a resource allocation mode corresponding to the SLRB is configured in radio resource control (RRC) signaling.

Based on each resource allocation mode, information of the SLRB allowed to use the resource allocation mode is given in the RRC signaling.

Further, when the resource allocation mode is configured based on each SLRB, and is independently configured based on each frequency band identifier, the configuration module 101 is used to implement one of the following methods:

The RRC signaling carries identification information of the frequency band identifier, and based on each frequency band identifier, the resource allocation mode corresponding to each SLRB transmitted on the frequency band identifier is configured.

The RRC signaling carries identification information of the frequency band identifier, and based on each frequency band identifier, the information of the SLRB allowed to use the resource allocation mode is configured for each resource allocation mode respectively.

Further, when the resource allocation mode is configured based on each SLRB, and is independently configured based on each RAT, the configuration module 101 is used to implement one of the following methods:

RRC signaling carries identification information of the RAT, and based on each RAT, the resource allocation mode corresponding to each SLRB transmitted on the RAT is respectively configured.

RRC signaling carries the identification information of the RAT, and based on each RAT, for each resource allocation mode, the information of the SLRB allowed to use the resource allocation mode is respectively configured.

Further, when the resource allocation mode is configured based on each SLRB, and is independently configured based on each frequency band identifier of each RAT, the configuration module 101 is used to implement one of the following methods:

RRC signaling carries the identification information of the RAT and the identification information of the frequency band identifier, and based on each frequency band identifier of each RAT, the resource allocation mode corresponding to each SLRB transmitted on the RAT is respectively configured.

RRC signaling carries the identification information of the RAT and the identification information of the frequency band identifier, based on each frequency band identification of each RAT, for each resource allocation mode, the information of the SLRB allowed to use the resource allocation mode is respectively configured.

Optionally, when the target includes the QoS parameters of the sidelink interface, the configuration mode of the resource allocation mode includes one of the following modes:

The resource allocation mode is configured based on different value combinations of all QoS parameters.

The resource allocation mode is configured based on different value combinations of all QoS parameters, and is independently configured based on each frequency band identifier.

The resource allocation mode is configured based on different value combinations of all QoS parameters, and is configured independently based on each RAT.

The resource allocation mode is configured based on different value combinations of all QoS parameters, and is independently configured based on each frequency band identifier of each RAT.

The resource allocation mode is configured based on different value combinations of part of QoS parameters.

The resource allocation mode is configured based on different value combinations of part of QoS parameters, and is independently configured based on each frequency band identifier.

The resource allocation mode is configured based on different value combinations of part of QoS parameters, and is independently configured based on each RAT.

The resource allocation mode is configured based on different value combinations of part of QoS parameters, and is independently configured based on each frequency band identifier of each RAT.

Optionally, when the target includes a frequency band identifier, the configuration module 101 is used to implement:

The first RRC signaling carries frequency band identification information, and a resource allocation mode corresponding to the frequency band identification is configured based on each frequency band identification.

Further, the configuration module 101 is also used to implement:

The first RRC signaling carries frequency band identification information, and based on each frequency band identification, for each resource allocation mode, information of SLRB allowed to use the resource allocation mode is respectively configured.

Optionally, when the target includes the RAT, the configuration module 101 is used to implement:

The second RRC signaling carries RAT information, and the resource allocation mode corresponding to the RAT is configured based on each RAT.

Further, the configuration module 101 is also used to implement:

The second RRC signaling carries RAT information, and based on each RAT, for each resource allocation mode, information of SLRB allowed to use the resource allocation mode are respectively configured.

It should be noted that the network device embodiment is corresponding to the foregoing method embodiment in a one-to-one manner, and all implementation in the foregoing method embodiment are applicable to the network device embodiment, and the same technical effect can also be achieved.

Figure 11:
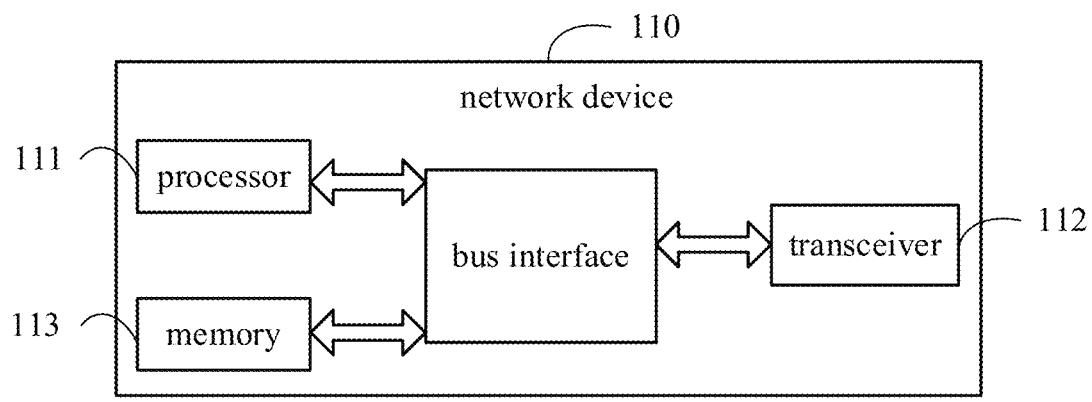
FIG. 11 shows a structural diagram of a network device according to some embodiments of the present disclosure.

As shown in FIG. 11, some embodiments of the present disclosure also provide a network device 110, including a processor 111, a transceiver 112, a memory 113, and a program that is stored on the memory 113 and executed by the processor 111. The transceiver 112 is connected to the processor 111 and the memory 113 through a bus interface, the processor 111 is used to read the program in the memory and perform the following process: for each target, configuring a resource allocation mode of a sidelink interface for a terminal.

The target includes at least one of the following information:
A radio bearer of the sidelink interface (Sidelink Radio Bearer, SLRB);
Quality of service (QoS) parameters of the sidelink interface;
A frequency band identifier;
Radio Access Technology (RAT) used by the sidelink interface.

The target includes at least one of the following information:
A radio bearer of the sidelink interface (Sidelink Radio Bearer, SLRB);
Quality of service (QoS) parameters of the sidelink interface;
A frequency band identifier;
Radio Access Technology (RAT) used by the sidelink interface.

Wherein, the frequency band identifier includes: a carrier, a frequency, or a bandwidth part (BWP).

It should be noted that in FIG. 11, the bus architecture may include any number of interconnected buses and bridges, and specifically various circuits of one or more processors represented by the processor 111 and the memory represented by the memory 113 are linked together. The bus architecture can also link various other circuits such as peripheral devices, voltage regulators, power management circuits, etc., which are all known in the art, and therefore, no further description will be given herein. The bus interface provides the interface. The transceiver 112 may be a plurality of elements, including a transmitter and a transceiver, and provide a unit for communicating with various other devices on a transmission medium. For different terminals, the processor 111 is responsible for managing the bus architecture and general processing, and the memory 113 can store data used by the processor 111 when performing operations.

Optionally, the processor further implements the following steps when executing the computer program: receiving terminal capability information reported by the terminal through the transceiver 112.

Specifically, the terminal capability information is used to indicate whether the terminal supports a plurality sidelink interface resource allocation modes at the same time.

Optionally, the processor implements the following steps when executing the program: receiving auxiliary information reported by the terminal through the transceiver 112.

Specifically, the auxiliary information is reported by the terminal based on one of the following information:

QoS parameters of the sidelink interface;
SLRB;
Frequency band identifier or RAT used by the sidelink interface.

Further, when the auxiliary information is reported by the terminal based on the QoS parameters of the sidelink interface, the terminal reports at least one of the following information:
Values of all or part of the QoS parameters used by a current service on the sidelink interface of the terminal;
Identifiers of the QoS parameter used by the current service on the sidelink interface of the terminal.

Further, when the auxiliary information is reported based on the SLRB, the terminal separately reports at least one of the following information for each SLRB:
Identification information of the SLRB;
Identification information of RAT corresponding to the SLRB;
A transmission frequency expected by the SLRB;
A communication target corresponding to the SLRB;
QoS parameters corresponding to the SLRB;
Service characteristics of the SLRB.

Specifically, the service characteristics include: service cycle information and/or data packet size.

Further, when the auxiliary information is reported based on the frequency band identifier or the RAT used by the sidelink interface, the auxiliary information includes at least one of the following information:
A identifier of the SLRB expected to be transmitted in the frequency band identifier and the RAT used by the sidelink interface;
A number of SLRBs expected to be transmitted in in the frequency band identifier and the RAT used by the sidelink interface;
The QoS parameters of the SLRB expected to be transmitted in the frequency band identifier and the RAT used by the sidelink interface.

Optionally, when the target includes SLRB, the configuration mode of the resource allocation mode includes one of the following modes:
The resource allocation mode is configured based on each SLRB.
The resource allocation mode is configured based on each SLRB, and is independently configured based on each frequency band identifier.
The resource allocation mode is configured based on each SLRB, and is independently configured based on each RAT.
The resource allocation mode is configured based on each SLRB, and is independently configured based on each frequency band identifier of each RAT.
The resource allocation mode is based on each SLRB configuration, and is independently configured based on each frequency band identifier of each RAT.

Further, when the resource allocation mode is configured based on each SLRB configuration, one of the following steps is implemented when the processor executes the program:
Based on each SLRB, a resource allocation mode corresponding to the SLRB is configured in radio resource control (RRC) signaling.
Based on each resource allocation mode, information of the SLRB allowed to use the resource allocation mode is given in the RRC signaling.

Further, when the resource allocation mode is configured based on each SLRB configuration and is independently configured based on each frequency band identifier, the processor implements one of the following steps when executing the program:

The RRC signaling carries identification information of the frequency band identifier, and based on each frequency band identifier, the resource allocation mode corresponding to each SLRB transmitted on the frequency band identifier is configured.

The RRC signaling carries identification information of the frequency band identifier, and based on each frequency band identifier, the information of the SLRB allowed to use the resource allocation mode is configured for each resource allocation mode respectively.

Further, when the resource allocation mode is configured based on each SLRB and is configured independently based on each RAT, the processor implements one of the following steps when executing the program:

RRC signaling carries identification information of the RAT, and based on each RAT, the resource allocation mode corresponding to each SLRB transmitted on the RAT is respectively configured.

RRC signaling carries the identification information of the RAT, and based on each RAT, for each resource allocation mode, the information of the SLRB allowed to use the resource allocation mode is respectively configured.

Further, when the resource allocation mode is configured based on each SLRB and is independently configured based on each frequency band identifier of each RAT, the processor implements one of the following steps when executing the program:

RRC signaling carries the identification information of the RAT and the identification information of the frequency band identifier, and based on each frequency band identifier of each RAT, the resource allocation mode corresponding to each SLRB transmitted on the RAT is respectively configured.

RRC signaling carries the identification information of the RAT and the identification information of the frequency band identifier, based on each frequency band identification of each RAT, for each resource allocation mode, the information of the SLRB allowed to use the resource allocation mode is respectively configured.

Optionally, when the target includes the QoS parameters of the sidelink interface, the configuration mode of the resource allocation mode includes one of the following modes:

The resource allocation mode is configured based on different value combinations of all QoS parameters.

The resource allocation mode is configured based on different value combinations of all QoS parameters, and is independently configured based on each frequency band identifier.

The resource allocation mode is configured based on different value combinations of all QoS parameters, and is configured independently based on each RAT.

The resource allocation mode is configured based on different value combinations of all QoS parameters, and is independently configured based on each frequency band identifier of each RAT.

The resource allocation mode is configured based on different value combinations of part of QoS parameters.

The resource allocation mode is configured based on different value combinations of part of QoS parameters, and is independently configured based on each frequency band identifier.

The resource allocation mode is configured based on different value combinations of part of QoS parameters, and is independently configured based on each RAT.

The resource allocation mode is configured based on different value combinations of part of QoS parameters, and is independently configured based on each frequency band identifier of each RAT.

Optionally, when the target includes a frequency band identifier, the processor implements the following steps when executing the program:

The first RRC signaling carries frequency band identification information, and a resource allocation mode corresponding to the frequency band identification is configured based on each frequency band identification.

Further, the processor further implements the following steps when executing the program:

The first RRC signaling carries frequency band identification information, and based on each frequency band identification, for each resource allocation mode, information of SLRB allowed to use the resource allocation mode is respectively configured.

Optionally, when the target includes the RAT, the processor implements the following steps when executing the program:

The second RRC signaling carries RAT information, and the resource allocation mode corresponding to the RAT is configured based on each RAT.

Further, the processor further implements the following steps when executing the program:

The second RRC signaling carries RAT information, and based on each RAT, for each resource allocation mode, information of SLRB allowed to use the resource allocation mode are respectively configured.

The network device can be a base station (Base Transceiver Station, BTS) in Global System of Mobile communication (GSM) or Code Division Multiple Access (CDMA), or it can be a base station (NodeB, NB) in Wideband Code Division Multiple Access (WCDMA), can also be an evolved base station (Evolutional Node B, eNB or eNodeB) in LTE, or a relay station or access point, or a base station in a further 5G network, etc. which are not limited here.

Some embodiments of the present disclosure further provide a computer-readable storage medium on which a computer program is stored, wherein the processor executes the computer program to implement the steps of the method for configuring the resource allocation mode applied to the network device.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource allocation mode configuration method, applied to a terminal, comprising:
receiving a resource allocation mode of a sidelink interface configured by a network device;
wherein the resource allocation mode is configured by the network device for each target,
the target includes at least one of the following information:
a radio bearer of the sidelink interface (Sidelink Radio Bearer, SLRB);
quality of service (QOS) parameters of the sidelink interface;

a frequency band identifier;
a radio access technology (RAT) used by the sidelink interface,
wherein the frequency band identifier includes: a carrier, a frequency, or a bandwidth part (BWP);
wherein before the receiving a resource allocation mode of a sidelink interface configured by a network device, the method further comprises:
reporting terminal capability information to the network device;
wherein the terminal capability information is used to indicate whether the terminal supports simultaneous use of a plurality of sidelink interface resource allocation modes.

2. The method according to claim 1, wherein before the receiving a resource allocation mode of a sidelink interface configured by a network device, the method further comprises:
reporting auxiliary information to the network device.

3. The method according to claim 2, wherein the auxiliary information is reported based on one of the following information:
QoS parameters of the sidelink interface;
SLRB;
a frequency band identifier or RAT used by the sidelink interface.

4. The method according to claim 3, wherein when the auxiliary information is reported based on the QoS parameters of the sidelink interface, the terminal reports at least one of the following information:
values of all or part of QoS parameters used by a current service on the sidelink interface of the terminal;
identifiers of the QoS parameters used by the current service on the sidelink interface of the terminal.

5. The method according to claim 3, wherein when the auxiliary information is reported based on the SLRB, the terminal separately reports at least one of the following information for each SLRB:
identification information of the SLRB;
identification information of RAT corresponding to the SLRB;
a transmission frequency expected by the SLRB;
a communication target corresponding to the SLRB;
QoS parameters corresponding to the SLRB;
service characteristics of the SLRB,
wherein the service characteristics include: service cycle information and/or a data packet size.

6. The method according to claim 3, wherein when the auxiliary information is reported based on the frequency band identifier or the RAT used by the sidelink interface, the auxiliary information includes at least one of the following information:
a identifier of the SLRB expected to be transmitted in the frequency band identifier and the RAT used by the sidelink interface;
a number of SLRBs expected to be transmitted in the frequency band identifier and the RAT used by the sidelink interface;
the QoS parameters of the SLRB expected to be transmitted in the frequency band identifier and the RAT used by the sidelink interface.

7. A resource allocation mode configuration method, applied to a network device, comprising:
configuring a resource allocation mode of a sidelink interface for a terminal for each target,
wherein the target includes at least one of the following information:
a radio bearer of the sidelink interface (Sidelink Radio Bearer, SLRB);
quality of service (QOS) parameters of the sidelink interface;
a frequency band identifier;
a radio access technology (RAT) used by the sidelink interface,
wherein the frequency band identifier includes: a carrier, a frequency, or a bandwidth part (BWP);
wherein before the configuring the resource allocation mode of the sidelink interface for the terminal for each target, the method further comprises:
receiving terminal capability information reported by the terminal,
wherein the terminal capability information is used to indicate whether the terminal supports simultaneous use of multiple sidelink interface resource allocation modes.

8. The method according to claim 7, wherein before the configuring the resource allocation mode of the sidelink interface for the terminal for each target, the method further comprises:
receiving auxiliary information reported by the terminal.

9. The method according to claim 8, wherein the auxiliary information is reported by the terminal based on one of the following information:
QOS parameters of the sidelink interface;
SLRB;
a frequency band identifier or RAT used by the sidelink interface,
wherein when the auxiliary information is reported by the terminal based on the QoS parameters of the sidelink interface, the terminal reports at least one of the following information:
values of all or part of QoS parameters used by a current service on the sidelink interface of the terminal;
identifiers of the QoS parameters used by the current service on the sidelink interface of the terminal.

10. The method according to claim 9, wherein when the auxiliary information is reported based on the SLRB, the terminal separately reports at least one of the following information for each SLRB:
identification information of the SLRB;
identification information of RAT corresponding to the SLRB;
a transmission frequency expected by the SLRB;
a communication target corresponding to the SLRB;
QoS parameters corresponding to the SLRB;
service characteristics of the SLRB,
wherein the service characteristics include: service cycle information and/or a data packet size.

11. The method according to claim 9, wherein when the auxiliary information is reported based on the frequency band identifier or the RAT used by the sidelink interface, the auxiliary information includes at least one of the following information:
a identifier of the SLRB expected to be transmitted in the frequency band identifier and the RAT used by the sidelink interface;
a number of SLRBs expected to be transmitted in in the frequency band identifier and the RAT used by the sidelink interface;
the QoS parameters of the SLRB expected to be transmitted in the frequency band identifier and the RAT used by the sidelink interface.

12. The method according to claim 7, wherein when the target includes SLRB, the configuration mode of the resource allocation mode includes one of the following modes that:
- the resource allocation mode is configured based on each SLRB;
- the resource allocation mode is configured based on each SLRB, and is independently configured based on each frequency band identifier;
- the resource allocation mode is configured based on each SLRB, and is independently configured based on each RAT;
- the resource allocation mode is configured based on each SLRB, and is independently configured based on each frequency band identifier of each RAT,
- wherein when the resource allocation mode is configured based on each SLRB, the configuring the resource allocation mode of the sidelink interface for the terminal includes one of the following modes that:
- based on each SLRB, a resource allocation mode corresponding to the SLRB is configured in radio resource control (RRC) signaling;
- based on each resource allocation mode, information of the SLRB allowed to use the resource allocation mode is given in the RRC signaling; or
- wherein when the resource allocation mode is configured based on each SLRB and is independently configured based on each frequency band identifier, the configuring the resource allocation mode of the sidelink interface for the terminal includes one of the following modes that:
- the RRC signaling carries identification information of the frequency band identifier, and based on each frequency band identifier, the resource allocation mode corresponding to each SLRB transmitted on the frequency band identifier is configured;
- the RRC signaling carries identification information of the frequency band identifier, and based on each frequency band identifier, the information of the SLRB allowed to use the resource allocation mode is configured for each resource allocation mode respectively; or
- wherein when the resource allocation mode is configured based on each SLRB and is independently configured based on each RAT, the configuring the resource allocation mode of the sidelink interface for the terminal includes one of the following modes that:
- the RRC signaling carries identification information of the RAT, and based on each RAT, the resource allocation mode corresponding to each SLRB transmitted on the RAT is respectively configured;
- the RRC signaling carries the identification information of the RAT, and based on each RAT, for each resource allocation mode, the information of the SLRB allowed to use the resource allocation mode is respectively configured; or
- wherein when the resource allocation mode is configured based on each SLRB and is configured independently based on each frequency band identifier of each RAT, the configuring the resource allocation mode of the sidelink interface for the terminal includes one of the following modes that:
- the RRC signaling carries the identification information of the RAT and the identification information of the frequency band identifier, and based on each frequency band identifier of each RAT, the resource allocation mode corresponding to each SLRB transmitted on the RAT is respectively configured;
- the RRC signaling carries the identification information of the RAT and the identification information of the frequency band identifier, based on each frequency band identification of each RAT, for each resource allocation mode, the information of the SLRB allowed to use the resource allocation mode is respectively configured.

13. The method according to claim 7, wherein when the target includes the QOS parameters of the sidelink interface, the configuration mode of the resource allocation mode includes one of the following modes that:
- the resource allocation mode is configured based on different value combinations of all QOS parameters;
- the resource allocation mode is configured based on different value combinations of all QOS parameters, and is independently configured based on each frequency band identifier;
- the resource allocation mode is configured based on different value combinations of all QoS parameters, and is configured independently based on each RAT;
- the resource allocation mode is configured based on different value combinations of all QOS parameters, and is independently configured based on each frequency band identifier of each RAT;
- the resource allocation mode is configured based on different value combinations of part of QOS parameters;
- the resource allocation mode is configured based on different value combinations of part of QoS parameters, and is independently configured based on each frequency band identifier;
- the resource allocation mode is configured based on different value combinations of part of QoS parameters, and is independently configured based on each RAT;
- the resource allocation mode is configured based on different value combinations of part of QoS parameters, and is independently configured based on each frequency band identifier of each RAT.

14. The method according to claim 7, wherein when the target includes a frequency band identifier, the configuring the resource allocation mode of the sidelink interface for the terminal comprises:
- a first RRC signaling carrying frequency band identification information, and configuring a resource allocation mode corresponding to the frequency band identification based on each frequency band identifier,
- wherein the configuring the resource allocation mode of the sidelink interface for the terminal further comprises:
- the first RRC signaling carrying frequency band identification information, and based on each frequency band identifier, for each resource allocation mode, configuring information of SLRB allowed to use the resource allocation mode respectively.

15. The method according to claim 7, wherein when the target includes a RAT, the configuring the resource allocation mode of the sidelink interface for the terminal comprises:
- a second RRC signaling carrying RAT information, and configuring the resource allocation mode corresponding to the RAT based on each RAT,
- wherein the configuring the resource allocation mode of the sidelink interface for the terminal further comprises:
- the second RRC signaling carrying the RAT information, and based on each RAT, for each resource allocation mode, configuring information of SLRB allowed to use the resource allocation mode respectively.

16. A network device, comprising: a transceiver, a memory, a processor, and a program stored on the memory and executed by the processor; wherein the processor executes the program to implement the resource allocation mode configuration method according to claim 7.

17. A terminal, comprising: a transceiver, a memory, a processor, and a program stored on the memory and executed by the processor; wherein the processor executes the program to implement the following steps:
   receiving a resource allocation mode of a sidelink interface configured by a network device;
   wherein the resource allocation mode is configured by the network device for each target,
   the target includes at least one of the following information:
   a radio bearer of the sidelink interface (Sidelink Radio Bearer, SLRB);
   quality of service (QOS) parameters of the sidelink interface;
   a frequency band identifier;
   a radio access technology (RAT) used by the sidelink interface,
   wherein the frequency band identifier includes: a carrier, a frequency, or a bandwidth part (BWP);
   wherein before the receiving a resource allocation mode of a sidelink interface configured by a network device, the processor executes the program to further implement:
   reporting terminal capability information to the network device;
   wherein the terminal capability information is used to indicate whether the terminal supports simultaneous use of a plurality of sidelink interface resource allocation modes.

* * * * *